(12) United States Patent
Bae et al.

(10) Patent No.: US 11,567,002 B2
(45) Date of Patent: Jan. 31, 2023

(54) ORGANISM IDENTIFICATION

(71) Applicant: Purdue Research Foundation, West Lafayette, IN (US)

(72) Inventors: Euiwon Bae, West Lafayette, IN (US); Arun K. Bhunia, West Lafayette, IN (US); Edwin Daniel Hirleman, Merced, CA (US); Huisung Kim, West Lafayette, IN (US); Bartlomiej Rajwa, West Lafayette, IN (US); Joseph Paul Robinson, West Lafayette, IN (US); Valery Patsekin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/010,802

(22) Filed: Sep. 2, 2020

(65) Prior Publication Data
US 2020/0400563 A1 Dec. 24, 2020

Related U.S. Application Data

(63) Continuation of application No. 15/515,499, filed as application No. PCT/US2015/053553 on Oct. 1, 2015, now abandoned.

(Continued)

(51) Int. Cl.
*G01N 21/47* (2006.01)
*G01N 21/25* (2006.01)
*G01N 21/51* (2006.01)

(52) U.S. Cl.
CPC .......... *G01N 21/47* (2013.01); *G01N 21/255* (2013.01); *G01N 21/51* (2013.01); *G01N 2021/4707* (2013.01); *G01N 2021/4709* (2013.01)

(58) Field of Classification Search
CPC .......... G01N 21/47; G01N 2021/4709; G01N 15/1468; G01N 2015/0065;
(Continued)

(56) References Cited

U.S. PATENT DOCUMENTS

| 5,352,901 A * | 10/1994 | Poorman | G08B 17/107 356/343 |
| 5,394,480 A * | 2/1995 | Shofner | G01N 15/1468 382/111 |

(Continued)

*Primary Examiner* — Mohamed K Amara
(74) *Attorney, Agent, or Firm* — Purdue Research Foundation

(57) ABSTRACT

A system for the identification of micro-organisms includes an irradiation unit adapted to sequentially provide coherent electromagnetic radiation of one or more wavelengths along a common optical path. A holder is adapted to retain a substrate having a surface adapted for growth of a micro-organism colony. A beamsplitter is adapted to direct the coherent electromagnetic radiation from the common optical path towards the retained substrate. An imager is arranged opposite the beamsplitter from the retained substrate and is adapted to obtain images of backward-scattered light patterns from the micro-organism colony irradiated by the respective wavelengths of the directed coherent electromagnetic radiation. Some examples provide radiation of multiple wavelengths and include an imager arranged optically downstream of the retained substrate to obtain images of forward-scattered light patterns from the micro-organism colony irradiated by the wavelengths of radiation. Organism identification methods are also described.

20 Claims, 24 Drawing Sheets

Related U.S. Application Data

(60) Provisional application No. 62/058,478, filed on Oct. 1, 2014, provisional application No. 62/058,734, filed on Oct. 2, 2014.

(58) Field of Classification Search
CPC .......... G01N 2021/5957; G01N 21/59; C12Q 1/04; C12Q 1/06; B01L 3/5027; B01L 3/502715; Y10S 430/146; Y10S 435/808
See application file for complete search history.

(56) References Cited

U.S. PATENT DOCUMENTS

| | | | | |
|---|---|---|---|---|
| 5,748,318 | A * | 5/1998 | Maris | G01N 29/0681 702/170 |
| 6,297,018 | B1 * | 10/2001 | French | C12Q 1/6825 435/5 |
| 6,447,724 | B1 * | 9/2002 | Jensen | G01N 15/06 422/504 |
| 6,825,921 | B1 * | 11/2004 | Modlin | G01N 21/76 356/73 |
| 7,465,560 | B2 * | 12/2008 | Hirleman, Jr. | G01N 21/21 435/34 |
| 7,623,227 | B2 * | 11/2009 | Judell | G01N 21/21 356/237.2 |
| 7,651,869 | B2 * | 1/2010 | Saaski | G01N 21/552 436/518 |
| 8,742,368 | B2 * | 6/2014 | Jones | G01J 3/0291 250/458.1 |
| 8,961,904 | B2 * | 2/2015 | Xia | B01L 3/502761 422/505 |
| 9,056,039 | B1 * | 6/2015 | Califorrniaa | C12M 21/06 |
| 2003/0019931 | A1 * | 1/2003 | Tsikos | G06V 30/144 235/454 |
| 2003/0153023 | A1 * | 8/2003 | Starzl | G01N 21/47 435/7.92 |
| 2004/0130714 | A1 * | 7/2004 | Gellerman | G01N 21/65 356/300 |
| 2004/0159797 | A1 * | 8/2004 | Wolleschensky | G01J 3/0229 250/458.1 |
| 2004/0166593 | A1 * | 8/2004 | Nolte | G01N 33/54373 436/518 |
| 2004/0246490 | A1 * | 12/2004 | Wang | G01J 3/0224 356/479 |
| 2006/0134004 | A1 * | 6/2006 | Gellermann | A61B 5/0059 600/315 |
| 2006/0192969 | A1 * | 8/2006 | Marks | G01N 21/65 356/451 |
| 2007/0133002 | A1 * | 6/2007 | Wax | G01N 21/4795 356/512 |
| 2008/0015802 | A1 * | 1/2008 | Urano | G01N 21/9501 356/73 |
| 2010/0290041 | A1 * | 11/2010 | Graham | C03B 23/047 356/246 |
| 2011/0298914 | A1 * | 12/2011 | Oshiro | G02B 21/245 348/79 |
| 2012/0069326 | A1 * | 3/2012 | Colonna de Lega | G01B 9/0209 356/73 |
| 2012/0080611 | A1 * | 4/2012 | Jones | G01J 3/0291 356/342 |
| 2012/0225475 | A1 * | 9/2012 | Wagner | G01N 15/1434 435/288.7 |
| 2013/0157283 | A1 * | 6/2013 | Yung | C12Q 1/04 435/7.1 |
| 2013/0330815 | A1 * | 12/2013 | Van Duyne | B82Y 30/00 435/287.9 |
| 2016/0003740 | A1 * | 1/2016 | Tao | G01N 21/6458 250/459.1 |
| 2017/0089823 | A1 * | 3/2017 | Wagner | G01N 21/65 |
| 2022/0163440 | A1 * | 5/2022 | Pertsinidis | G01N 15/1468 |

* cited by examiner

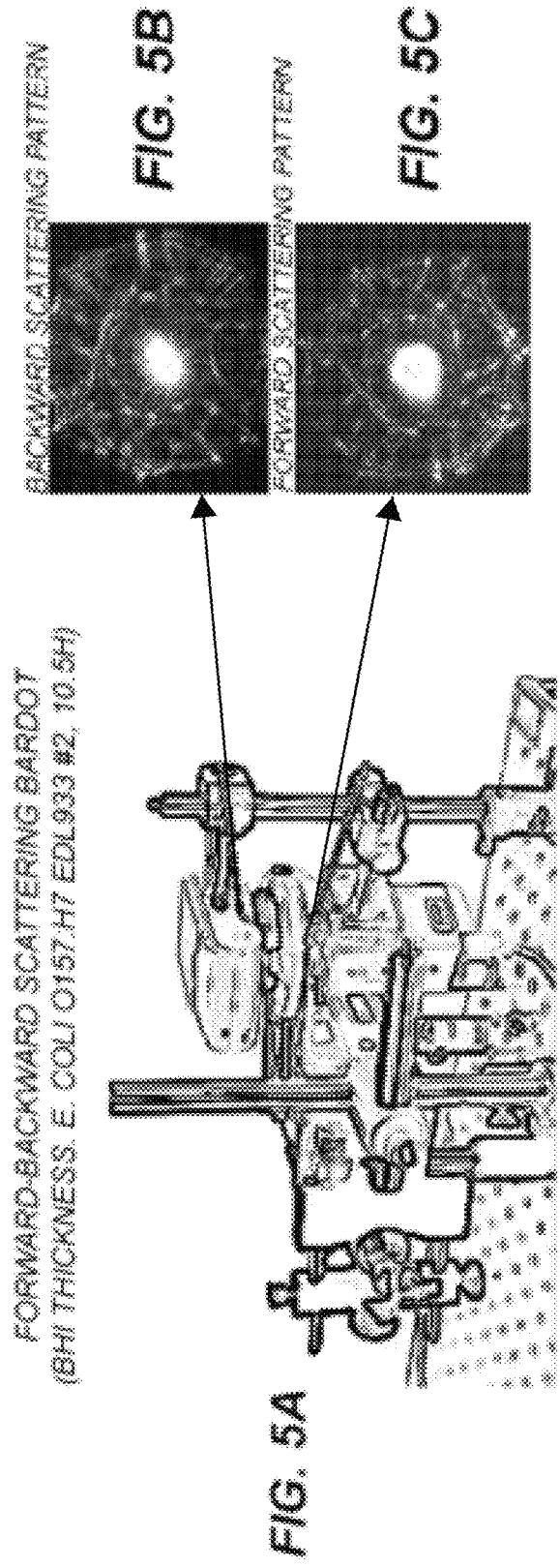
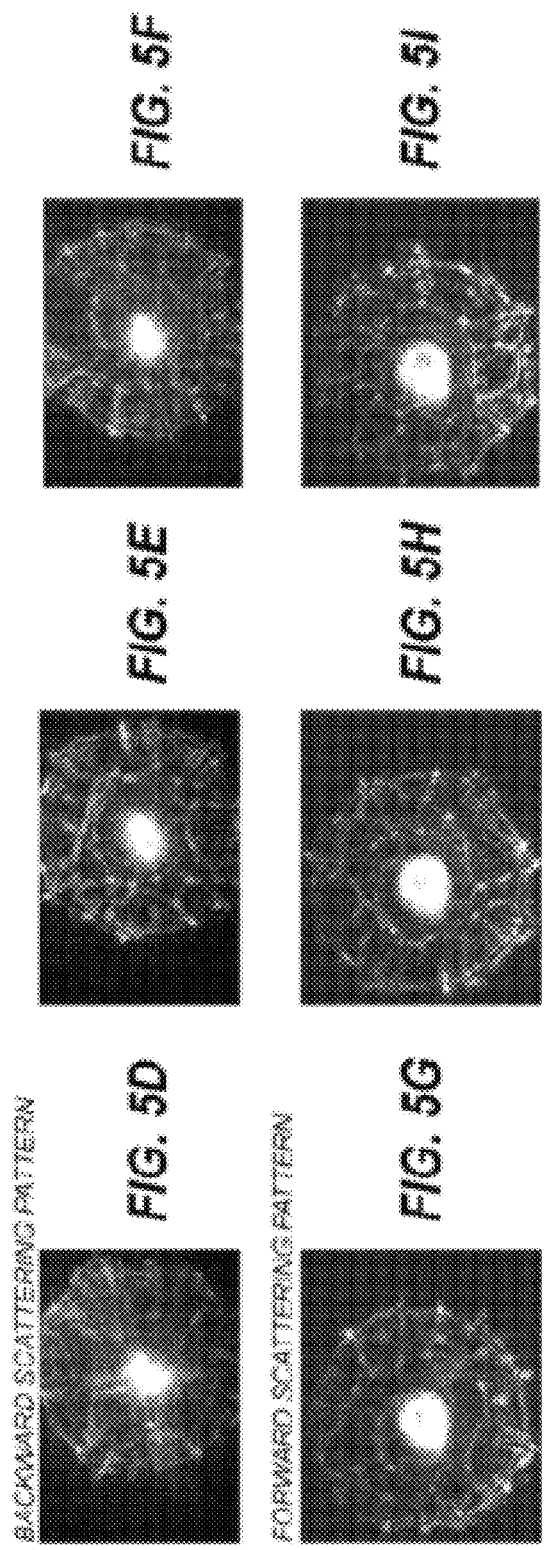
FIG. 5A FORWARD-BACKWARD SCATTERING BARDOT (BHI THICKNESS, E. COLI O157:H7 EDL933 #2, 10.5H)
FIG. 5B BACKWARD SCATTERING PATTERN

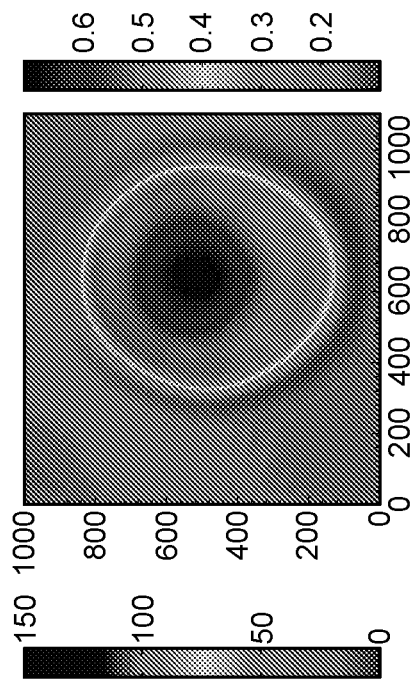
FIG. 8C
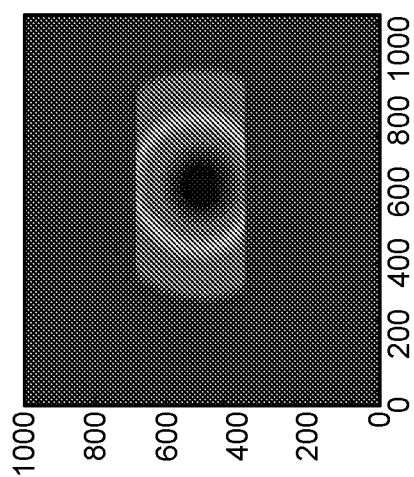
FIG. 8B
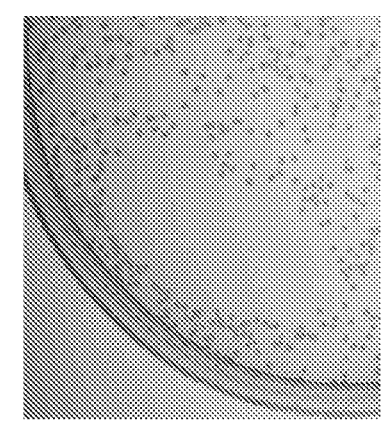
FIG. 8A
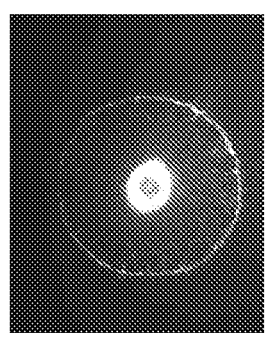
FIG. 8E
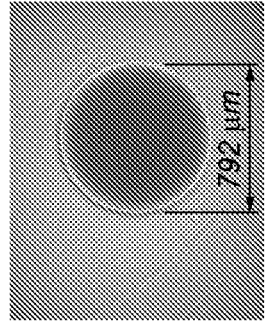
FIG. 8D
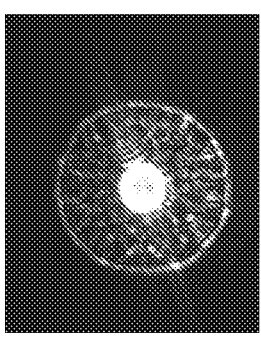
FIG. 8G
FIG. 8F
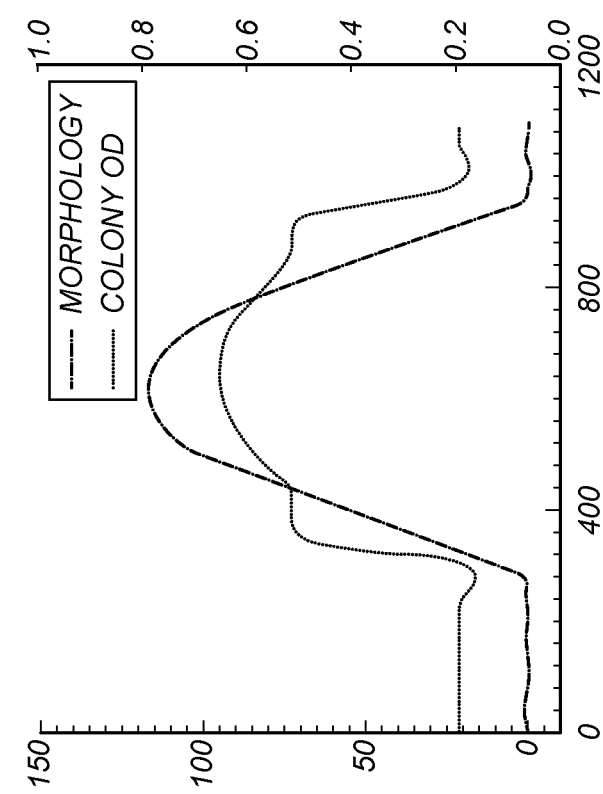
FIG. 8H

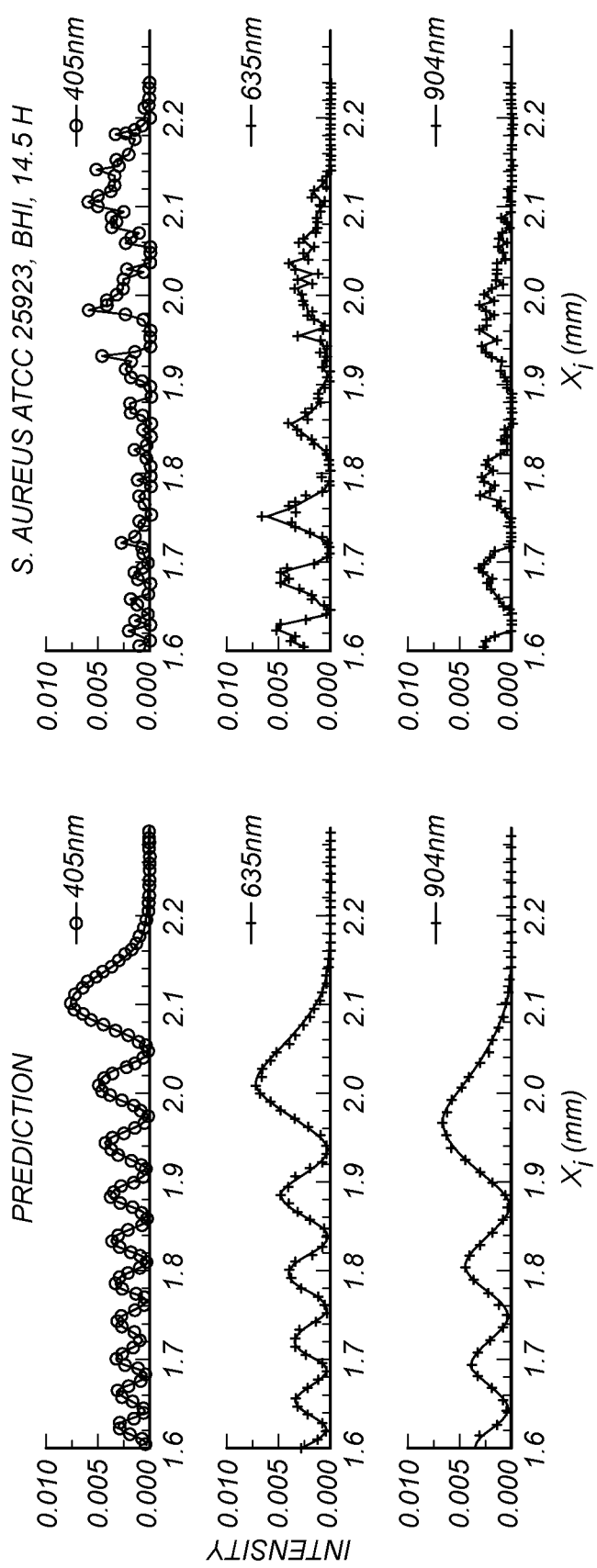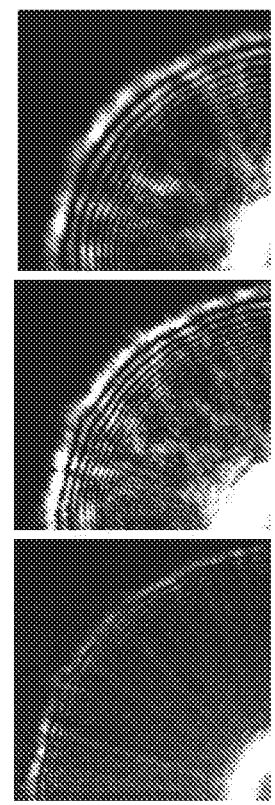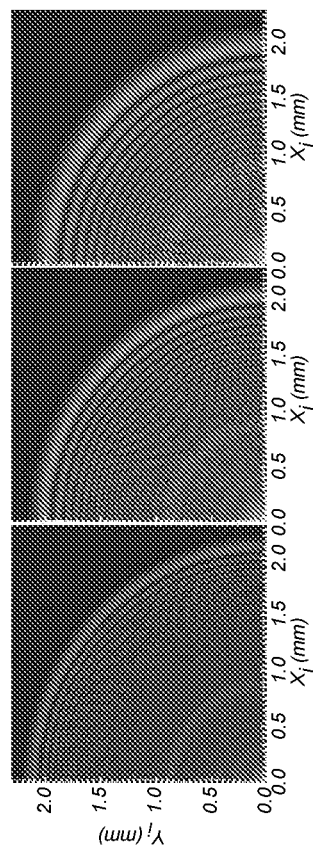
FIG. 11A  FIG. 11B  FIG. 11C  FIG. 11D

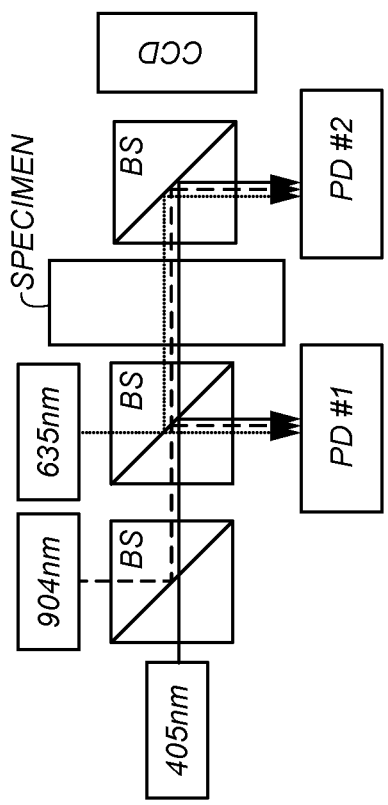
FIG. 14B  OD MONITORING MODE
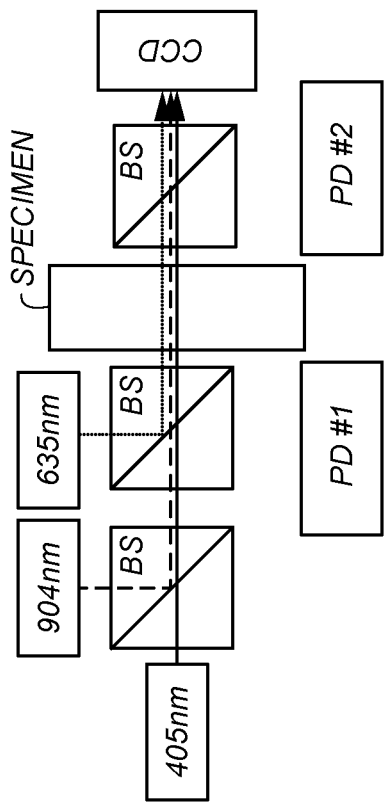
FIG. 14A  FORWARD SCATTERING MODE

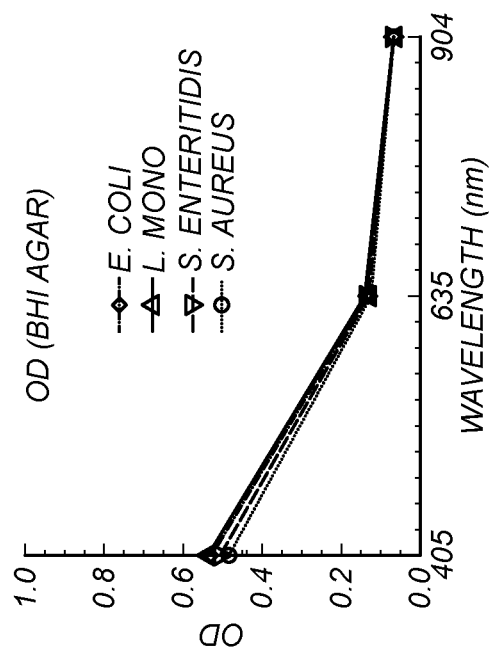
FIG. 17A
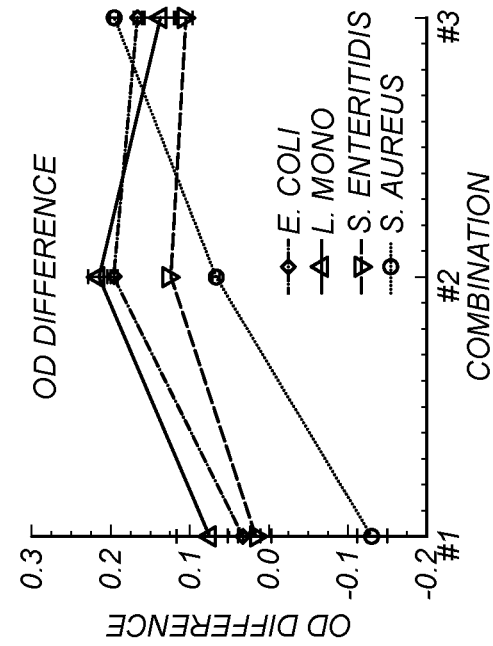
FIG. 17B
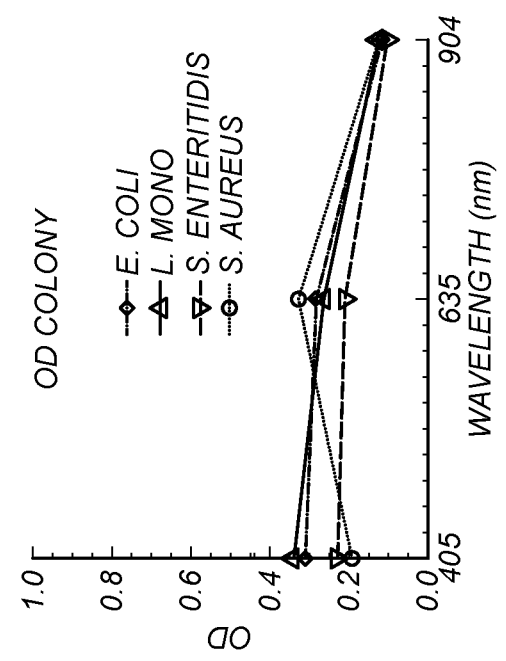
FIG. 17C
FIG. 17D

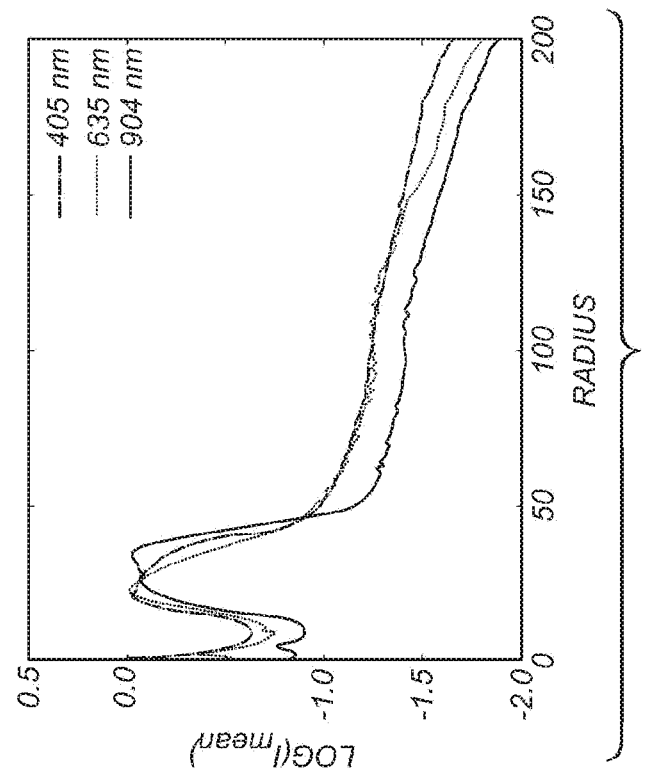
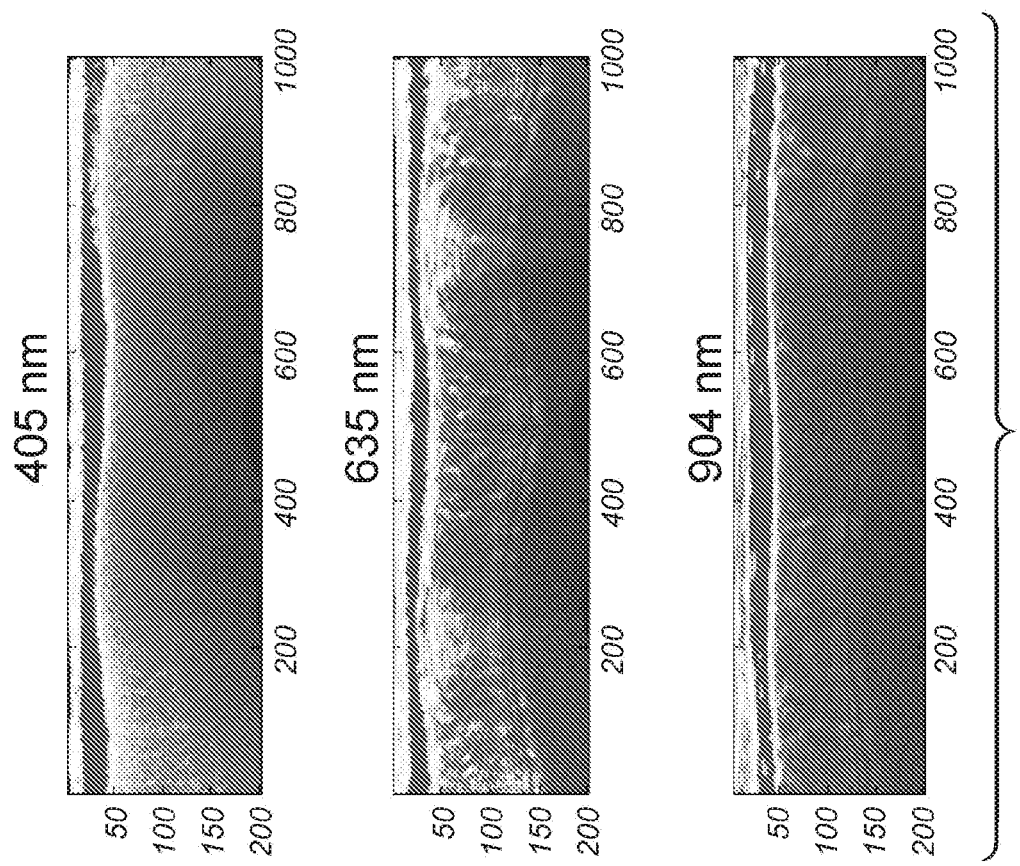
FIG. 20B
FIG. 20A 635 nm

ALL WAVELENGTHS 405 nm 904 nm

ORGANISM IDENTIFICATION

CROSS-REFERENCE TO RELATED APPLICATIONS

The present application is a continuation of U.S. patent application Ser. No. 15/515,499, filed Mar. 29, 2017, which is a 35 U.S.C. § 371 national phase application of PCT/US2015/053553 filed Oct. 1, 2015, which claims priority to, and the benefit of, U.S. Patent Application Ser. No. 62/058,478, filed Oct. 1, 2014, and U.S. Patent Application Ser. No. 62/058,734, filed Oct. 2, 2014, the entirety of each of which is incorporated herein by reference.

STATEMENT OF FEDERALLY SPONSORED RESEARCH OR DEVELOPMENT

This invention was made with Government support under Contract No. 59-1935-2-279 awarded by the United States Department of Agriculture—Agricultural Research Service. The government has certain rights in the invention.

TECHNICAL FIELD

The present application relates to characterizing, classifying, or identifying microscopic structures. Various aspects relate to such structures including, e.g., colonies of micro-organisms, clusters of cells, or organelles.

BACKGROUND

Rapid identification and classification of microbial organism is a useful task in various areas, such as biosurveillance, biosecurity, clinical studies, and food safety. There is, for example, a need for methods for monitoring and detecting pathogenic micro-organism such as *Escherichia coli, Listeria, Salmonella*, and *Staphylococcus*.

BRIEF DESCRIPTION

A system for the identification of micro-organisms includes an irradiation unit adapted to sequentially provide coherent electromagnetic radiation of one or more wavelengths along a common optical path. A holder is adapted to retain a substrate having a surface adapted for growth of a colony of micro-organisms. A beamsplitter is adapted to direct the coherent electromagnetic radiation from the common optical path towards the retained substrate. An imager is arranged opposite the beamsplitter from the retained substrate and is adapted to obtain images of backward-scattered light patterns from the micro-organism colony irradiated by the respective wavelengths of the directed coherent electromagnetic radiation. Some examples provide radiation of multiple wavelengths and include an imager arranged optically downstream of the retained substrate to obtain images of forward-scattered light patterns from the micro-organism colony irradiated by the wavelengths of radiation. Organism identification methods are also described.

This brief description is intended only to provide a brief overview of subject matter disclosed herein according to one or more illustrative embodiments, and does not serve as a guide to interpreting the claims or to define or limit scope, which is defined only by the appended claims. This brief description is provided to introduce an illustrative selection of concepts in a simplified form that are further described below in the Detailed Description. This brief description is not intended to identify key features or essential features of the claimed subject matter, nor is it intended to be used as an aid in determining the scope of the claimed subject matter. The claimed subject matter is not limited to implementations that solve any or all needs or disadvantages noted in the Background.

BRIEF DESCRIPTION OF THE DRAWINGS

The above and other objects, features, and advantages will become more apparent when taken in conjunction with the following description and drawings wherein identical reference numerals have been used, where possible, to designate identical features that are common to the figures, and wherein:

FIG. 5A is a graphical representation of a photograph of components of a constructed scattering pattern measurement instrument according to various examples;

FIG. 5B shows an example measured backward scattering pattern of an example bacterial colony;

FIG. 5C shows an example measured forward scattering pattern corresponding to the example bacterial colony of FIG. 5B;

FIG. 5D shows an example measured backward scattering pattern of an example bacterial colony;

FIG. 5E shows an example measured backward scattering pattern of an example bacterial colony;

FIG. 5F shows an example measured backward scattering pattern of an example bacterial colony;

FIG. 5G shows an example measured forward scattering pattern corresponding to the example bacterial colony of FIG. 5D;

FIG. 5H shows an example measured forward scattering pattern corresponding to the example bacterial colony of FIG. 5E;

FIG. 5I shows an example measured forward scattering pattern corresponding to the example bacterial colony of FIG. 5F;

FIG. 8A is a graphical representation of a visible-light photograph of S. aureus colonies on a BHI agar plate;

FIG. 8B is a graphical representation of a 3D morphology map of an example S. aureus colony measured using the Integrated Colony Morphology Analyzer (ICMA);

FIG. 8C is a graphical representation of an optical density (OD) map of the example colony;

FIG. 8D is a graphical representation of a phase contrast microscope (PCM) image of the example colony;

FIG. 8E is a graphical representation of a measured 405 nm forward scatter pattern image of the example colony;

FIG. 8F is a graphical representation of a measured 635 nm forward scatter pattern image of the example colony;

FIG. 8G is a graphical representation of a measured 904 nm forward scatter pattern image of the example colony;

FIG. 8H is a graph showing cross sectional morphology and OD profile of a center region of the example colony;

FIG. 11A is a graph showing simulated intensity profiles of forward scattering patterns at various wavelengths;

FIG. 11B is a graph showing measured intensity profiles of forward scattering patterns of an example bacterial colony at various wavelengths;

FIG. 11C is a graphical representation of a quarter view of the simulated scatter patterns of FIG. 11A; and FIG. 11D is a graphical representation of a quarter view of the measured scatter patterns of FIG. 11B;

FIG. 14A shows an example of an optical path according to various aspects;

FIG. 14B shows an example of an optical path according to various aspects;

FIG. 17A shows a tested experimental configuration;

FIG. 17B is a graph showing experimental data of optical density of agar plates;

FIG. 17C is a graph showing experimental data of optical density of bacterial colonies on agar plates;

FIG. 17D is a graph showing optical density of measured bacterial colonies;

FIG. 20A shows graphical representations of polar intensity plots of measured scattering patterns for example bacterial colonies at various wavelengths;

FIG. 20B shows average intensity as a function of radius for scatter patterns of a measured bacterial colony at various wavelengths;

Figure 1:
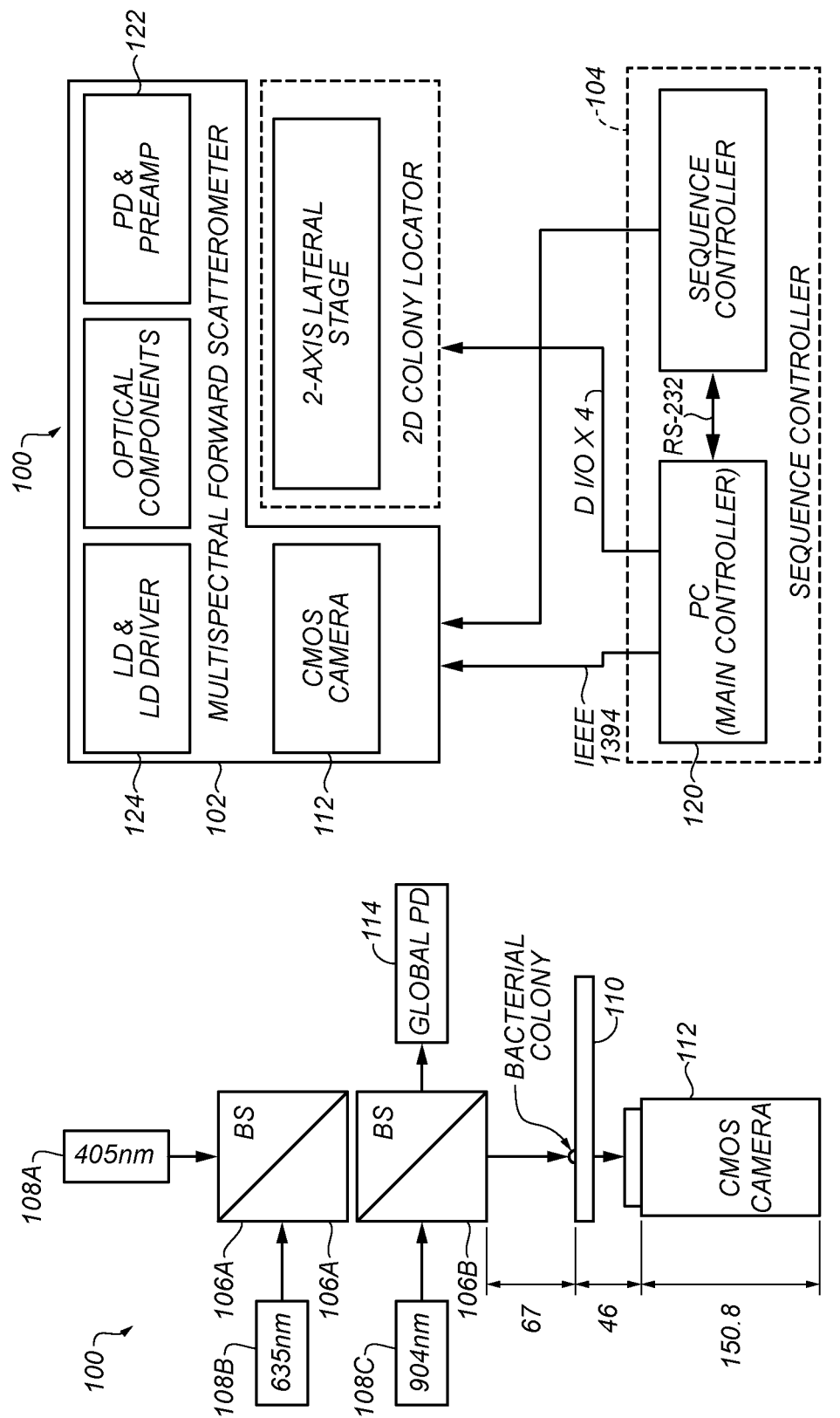
FIG. 1A shows a schematic diagram of components of an example system for the identification of micro-organisms.
FIG. 1B shows a schematic diagram of components of an example system for the identification of micro-organisms.

The attached drawings are for purposes of illustration and are not necessarily to scale.

DETAILED DESCRIPTION

This application is related to U.S. Pat. No. 7,465,560, issued Dec. 16, 2008, and U.S. Pat. No. 8,787,633, issued Jul. 22, 2014, the contents of which are incorporated herein by reference in their entirety.

Various aspects herein advantageously relate to scalar diffraction modeling of multispectral forward scatter patterns from bacterial colonies. While conventional culture based methods are still used, utilizing laser scattering phenomena from bacterial colonies has provided a possible label-free discrimination methodology, named Bacteria Rapid Detection using Optical scattering Technology (BAR-DOT). Various aspects herein relate to a multispectral domain which provides additional optical characteristics such as spectral absorption and spectral forward scattering patterns. Various aspects permit classifying bacterial colonies as to the subspecies of bacteria in the colony, e.g., at the serovar level.

Compared to conventional detection methods, label-free optical diagnostics delivers fast and accurate results, and provides cost-effective and non-destructive evaluation of the samples, allowing for secondary confirmation with further verification.

Owing to the wide range of the spectral region that is available for optical diagnostics, different optical windows ranging from UV to IR for the detection and classification of micro-organisms have been used in the art. In the area of food inspection, numerous uses of hyperspectral imaging to classify the quality of harvested vegetables, fruits, meats, and poultry can be used. Spectral imaging can also be used in biomedical applications such as skin cancer detection, heart disease diagnostics, and detection of retinal diseases.

Spectral techniques used in the art rely on standard far-field imaging. However, cells and bacterial colonies are three dimensional objects, and optically interrogating the whole volume can provide better classification accuracy. A label free, non-destructive, and automated detection technique, based on elastic light scatter (ELS) patterns of bacteria colonies from a single-wavelength laser, has been used in the art for rapid detection and classification of microbial organisms. It is applicable and effective for a limited number of genera or species of various different organisms. While the interrogation photons interact with the whole volumes of the colonies, thus imprinting better phenotypic characteristics than simple reflective imaging, classification performance suffers when large number of species and strains are analyzed simultaneously.

Various aspects relate to scalar diffraction imaging of multispectral forward scattering patterns for bacterial colonies and multispectral bacterial phenotyping. According to an aspect of the invention, there is provided a new design and validation of a multispectral forward scatter phenotyping instrument called MultiSpectral BActerial Rapid Detection using Optical scattering Technology (MS-BARDOT) which combines multiple wavelength diode laser sources. A variety of embodiments of the invention provide an optical density (OD) measurement unit with the conventional BARDOT system. Various embodiments advantageously provide the simultaneous measurement of both multiple wavelengths of forward scattering pattern and OD of a bacteria colony. Various embodiments advantageously provide a series of coordinate matched and correlated bio-optical characteristics of colonies, consequently improving the classification accuracy of previously introduced standard BARDOT system. Various experiments were performed in which scattering patterns of four pathogenic bacteria were measured and analyzed. Various embodiments of MS-BARDOT can advantageously perform in-situ measurement of three different wavelength forward scattering patterns of a bacterial colony within four seconds without moving the specimen. Various embodiments of the invention can include a reflection scatterometer providing reflection patterns, e.g., of opaque samples such as bacterial colonies on opaque agar.

Various embodiments advantageously can simultaneously detect three-wavelength scatter patterns and the associated optical density from individual bacterial colonies, overcoming a limitation of prior instruments that used a single wavelength for signal collection. Various examples can use absorption measurement of liquid bacterial samples in addition to spectroscopic information to distinguish samples. Various examples use optical components such as pellicle beam splitter and optical cage system for robust acquisition of multispectral images. Various embodiments advantageously can perform scatter pattern classification by combining the features collected at all three wavelengths and selecting the best features via feature selection mechanisms, thereby providing better classification rates than the same number of features at a single wavelength.

Optical interrogation of biological samples is popular in diverse fields from agricultural to biomedical applications. Due to the inherent wide spectral window of the optical interrogation, strategic selection of appropriate wavelengths is useful for enhanced resolution and proper classification of the biological sample. In biomedical applications, multispectral technique has been widely used in skin diagnostics and microscopic dark-field imaging. In the agricultural and food science fields, multispectral spectral reflectance measurements can be used to automatically detect and monitor the quality of the harvested fruits. In some examples, acquiring spectral reflection images from bacterial colonies on the surface of food can permit label-free classification and identification of such colonies.

Recently, there has been developed a label-free colony based bacterial classification system which utilizes the single 635 nm wavelength for interrogation. Various examples of the system can be used for classifying genus and species levels and some cases down to serovar levels. Bacterial colonies can be modeled as a biological spatial light modulator which changes the amplitude and phase of the outgoing wave and the characteristics of the scatter patterns to the morphological trait of the individual colonies were closely investigated. Various colonies have profiles such as convex shapes with different radii of curvature and a Gaussian profile. For example, a profile of a *Staphylococcus Aureus* (*S. aureus*) colony can closely match a Gaussian curve, which is similar to a bell curve with a tailing edge with smaller aspect ratio (colony height to diameter ratio). In a tested example, a measured colony generated a concentric circular diffraction pattern. Various aspects herein permit measuring the 3D morphology of each colony and 3D Optical Density (OD) map simultaneously without moving specimen. *Staphylococcus* is a common micro-organism and can reside on the human skin and other organisms, and has a relatively simple colony morphology and a substantially concentric circular diffraction pattern.

Various aspects herein describe a multiple wavelength interrogation instrument which permits determining scatter patterns from different laser wavelengths. Various aspects of the multispectral approach provide: 1) capability to provide ELS patterns in multiple wavelengths, 2) acquisition of spectral optical density, and 3) leverage of different spectral response via wavelength-dependent refractive indices. Various aspects herein use scalar diffraction theory to model the ELS patterns across visible range of spectrum. Detailed simulation and prediction of the multispectral ELS patterns can be performed. For experimental verification, an example MS-BARDOT system was constructed. The example system included stackable cage type pellicle beam splitter units. *Staphylococcus aureus* was chosen as a model organism and the spectral ELS patterns from three different interrogation wavelengths were compared.

FIGS. 1A and 1B show schematic diagrams of measurement device 100, e.g., an MS-BARDOT instrument, according to various aspects. The illustrated example instrument includes a multispectral forward scatterometer 102 and a sequence controller 104. Some embodiments can also include a two-dimensional stage, as discussed below with reference to FIG. 2. The optics shown in FIG. 1A can include one, two, three, or more beamsplitters 106, e.g., cage type R45:T55 pellicle beam splitters (e.g., supplied by Thorlabs Inc., NJ, USA), which can be selected to reduce ghost effects which can arise with some glass type beam splitters. In FIG. 1A, arrows show paths of light travel. In the illustrated example, two pellicle beam splitters 106A and 106B for light sources 108 are positioned above a target, e.g. a petri dish 110, at a distance of, e.g., 67 mm from the top of the petri dish 110 to the center of the bottom pellicle beam splitter 106B. In some examples of light sources, two collimated 1 mW laser diode modules with round beams, one emitting at 405 nm and the other at 635 nm (Coherent Inc., CA, USA), and a 904 nm laser diode module (Lasermate Group Inc., CA, USA), can be used as 108A, 108B, 108C, respectively, and mounted to the ports of cage mounted pellicle beam splitter units 106, e.g., as shown. In various embodiments, the choice of individual wavelengths can be selected based on the spectral absorption characteristics of the desired target bacterial genera, and the availability of specific spectral lines from a diode laser or other light source. Some examples using a stacked pellicle beam splitter unit design permit measuring multispectral ELS patterns from a bacterial colony in less than, e.g., 4-5 seconds without moving the specimen target. As used herein, the light from sources 108A, 108B, 108C travels in a "downstream" direction, in this example through the colony to the imager 112. The opposite direction, towards the sources, is an "upstream" direction.0

To capture a forward scattering pattern, in a tested configuration, a monochromatic CMOS camera 112 (Pixelink, PL-B741, ON, Canada) with 1280(H)×1024(V) pixels and 6.7-μm-unit pixel size was located under the petri dish 110 at a distance of, e.g., 9.7 mm or 39 mm from the bottom of the petri dish to the surface of the image sensor. In addition to the pellicle beam splitters, some embodiments include an additional port and a spectral intensity monitor (see FIG. 2). A Si photodiode 114 (Thorlabs Inc., CA, USA) (PD) with an active wavelength range of from 400 nm to 900 nm was mounted to bottom pellicle beam splitter 106B. CMOS camera 112 is one example of an imager; other imagers can be used, e.g., CCD imagers, film capture devices, or latent-image sensors such as those used in computed radiography. In some examples, the sources 108A, 108B, 108C can be illuminated sequentially. In other examples, at least two of the sources 108A, 108B, or 108C can be illuminated simultaneously.

Figure 2:
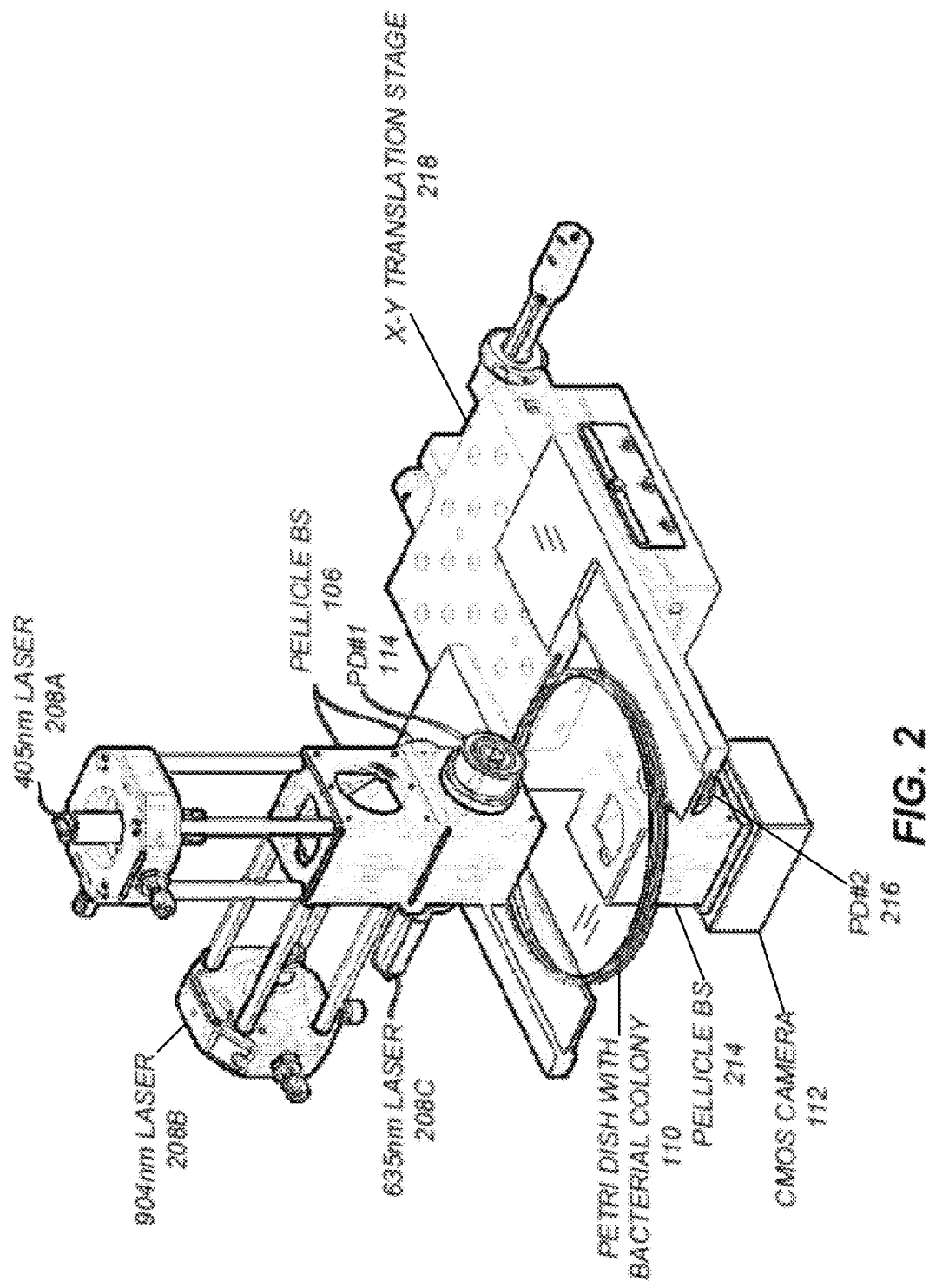
FIG. 2 shows a mechanical drawing of components of an example system for the identification of micro-organisms.

FIG. 2 shows a schematic diagram of one embodiment of optical components useful, e.g., with electric and mechanical components illustrated in FIG. 1B. Using two caged R45:T55 pellicle beam splitters 106, three different wavelength LDs (Laser Diodes) 208 as light sources, a PIN PD (Photo Diode) 114 as a LD intensity monitor, and a CMOS sensor 112 as a forward scattering pattern capture unit, induced forward scattering pattern of a bacteria colony can be measured at multiple different wavelengths without moving the specimen. In an experiment, measurements of a colony were collected at three different wavelengths within 4 seconds.

FIG. 2 also shows a holder having two arms supporting the petri dish 110. In some examples, the system can include this or another configuration of holder adapted to retain, directly or via one or more plates, petri dishes, or other supports, a substrate such as an agar gel having a surface adapted for growth of one or more colonies of microorganisms. Example agars are described herein. The holder can include one or more forks, arms, pins, or other retention features or mechanisms. As used herein, references to positioning or orientation of components with respect to a retained substrate apply whether or not a substrate is retained at any particular time. As used herein, references to positioning of parts opposite one another or opposite other parts do not constrain the tolerances or imply any requirement of coaxiality unless otherwise specified.

In some embodiments, e.g. for optical density (OD) measurement, an additional pellicle beam splitter 214 can be positioned between the petri dish 110 and the CMOS camera 112, and two Si photodiodes (PD) 114, 216, e.g., with an active wavelength range of from 400 nm to 900 nm, can be operationally arranged with respect to the middle and bottom pellicle beam splitters 106, 214. The PD 114 attached to the middle beam splitter 106 can monitor the intensity of incident light, while the PD 216 integrated to the bottom beam splitter 214 can measure that of light transmitted through a sample.

The sequence controller 104, FIG. 1B, can include a microcontroller unit (MCU) (e.g., an Atmel AVR128) as a data acquisition unit, and a personal computer 120 (PC) as a master controller. Using, e.g., the MCU's internal 10 bit A/D conversion, signals from variable non-inverting amplified and $2^{nd}$ low pass filtered photodiode (system 122) are captured, and transferred to the PC 120, e.g., through a data connection such as a USB or RS-232C interface. Three intensity-tunable diode laser drivers 124 are connected to the digital I/O of the MCU. The CMOS camera 112 is connected to PC 120 with, e.g., IEEE 1394 or another high-speed bus or interface, and is controlled using the software development kit (SDK) from manufacturer (Pixelink, ON, Canada). The PC 120 can control sequences and log synchronized information, tagged with the incident wavelength. OD of the sample can be determined for each wavelength, as will be described below.

Figure 3B:
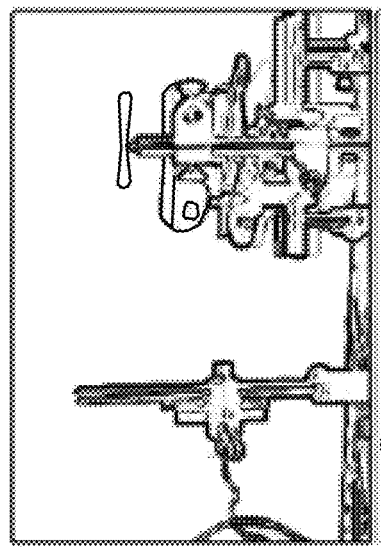
FIG. 3B is a graphical representation of a photograph of components of a constructed scattering pattern measurement instrument according to various examples.
Figure 3C:
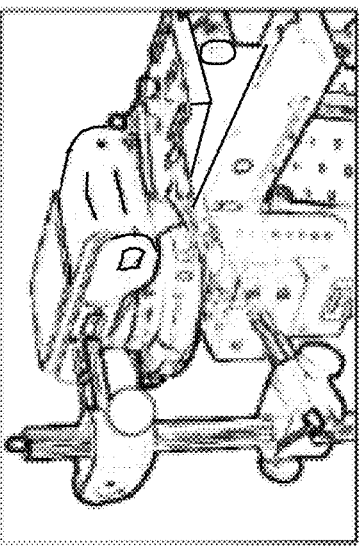
FIG. 3C is a graphical representation of a photograph of components of a constructed scattering pattern measurement instrument according to various examples.
Figure 3D:
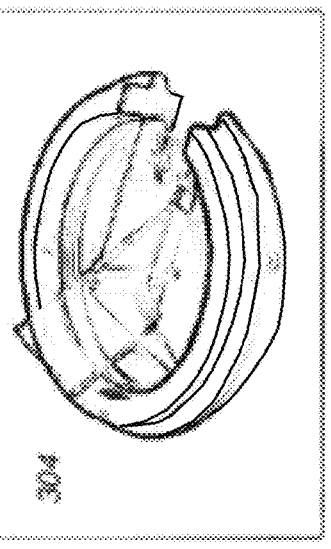
FIG. 3D is a graphical representation of a photograph of an example beamsplitter and related components useful with various examples such as that shown in FIG. 3A.
Figure 3A:
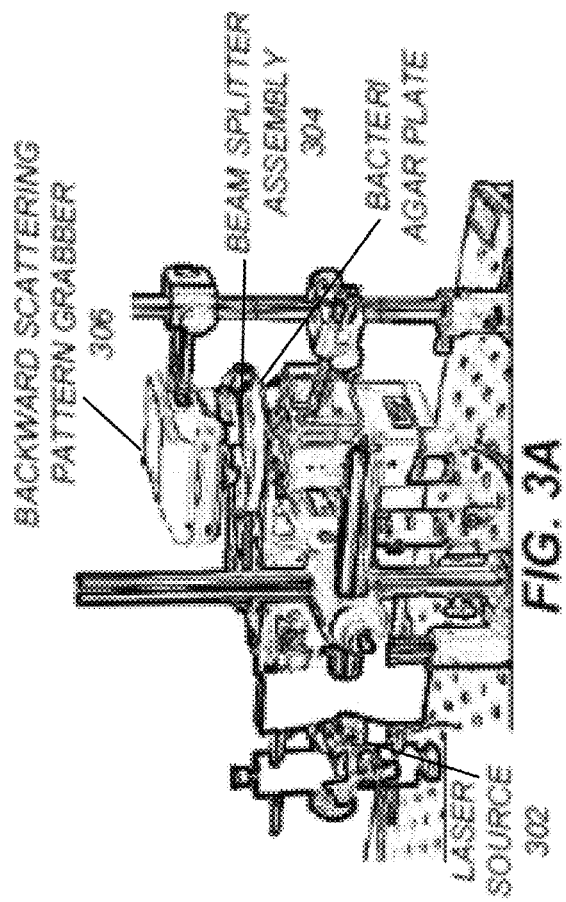
FIG. 3A is a graphical representation of a photograph of components of a constructed scattering pattern measurement instrument according to various examples.
Figure 3E:
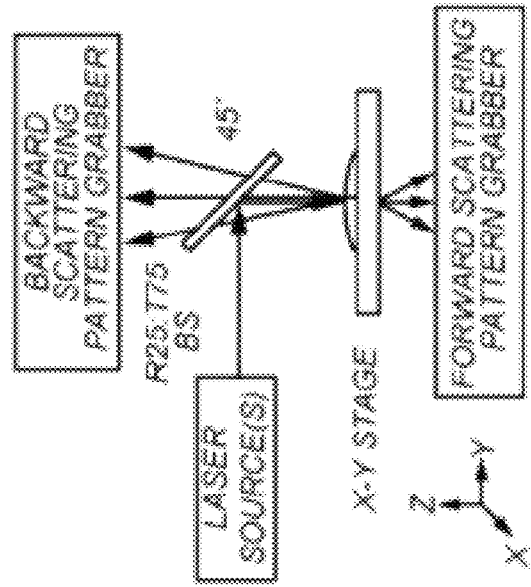
FIG. 3E is a schematic showing optical components of an example scattering pattern measurement instrument.

In a variety of embodiments, a reflection type scatterometer can be included as shown in FIGS. 3A-3E. These embodiments can be useful for opaque samples, such as fungi, mold, or yeast. As shown in FIG. 3A-3C, the reflection scatterometer utilizes a laser source 302 directed to a beam splitter 304 (R25:T75 BS in the diagram), and a large area CMOS (or other) detector 306 (referred to in FIG. 3A as a backward scattering pattern grabber).

As discussed below, four genera of bacteria (*Escherichia coli* O157:H7 EDL933, *Listeria monocytogenes* F4244, *Salmonella enteritidis* PT21 and *Staphylococcus aureus* ATCC 25923) were measured using instruments such as discussed above with reference to FIGS. 1A, 1B, 2, and 3A-3D. The acquired information showed differences in scatter characteristics between the tested organisms. In addition, colony-based spectral optical density information was also collected. Optical modeling performed using diffraction theory correctly predicted wavelength-related differences in scatter patterns which were matched by the experimental results.

Figure 4B:
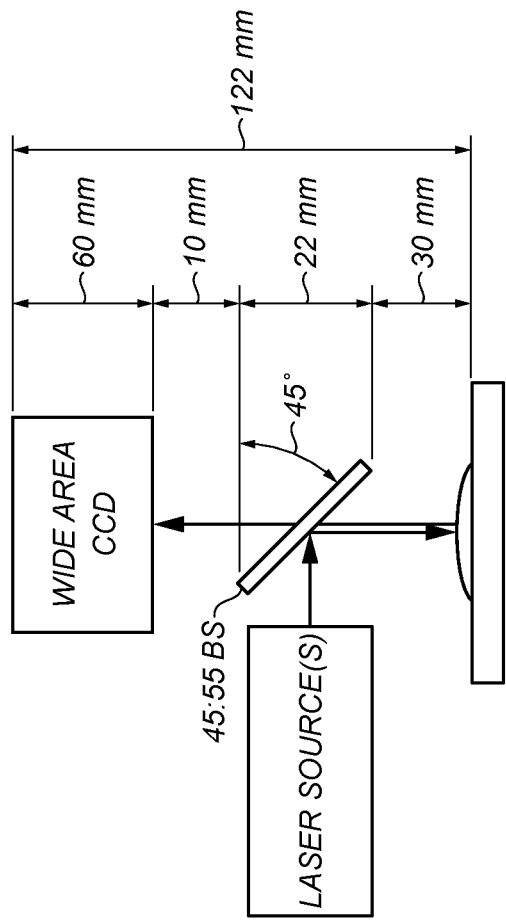
FIG. 4B shows an example of an optical path according to various aspects.
Figure 4A:
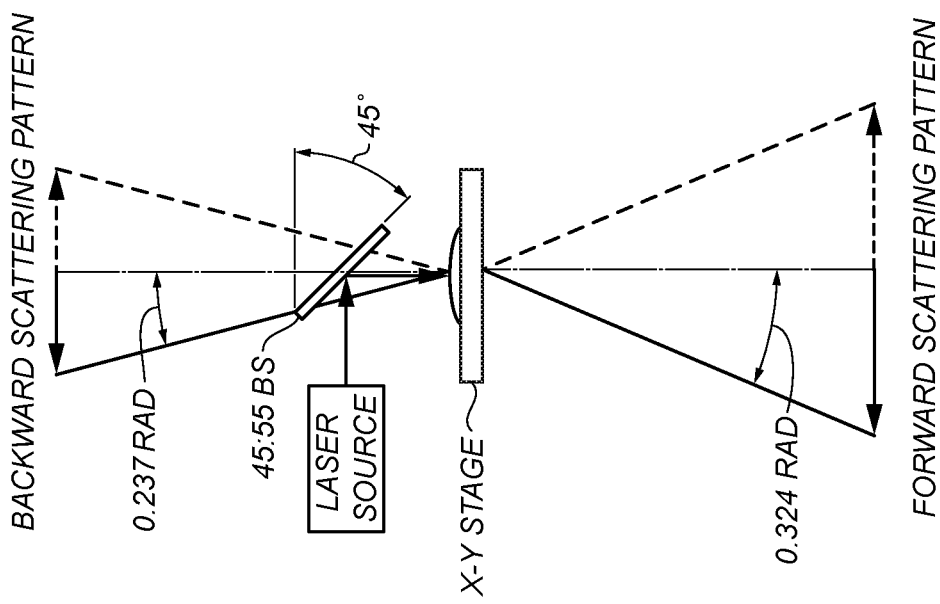
FIG. 4A shows an example of an optical path according to various aspects.

FIG. 4A shows an example of an optical path according to various aspects. FIG. 4A illustrates geometry of example reflective/transmissive imaging systems such as discussed below with reference to FIG. 5A.

FIG. 4B shows an example of an optical path according to various aspects. FIG. 4B illustrates geometry of example reflective imaging systems such as discussed above with reference to FIG. 3A. Table 1 shows example characteristics of imagers that can be used, e.g., as imagers 112, 306, according to various examples.

TABLE 1

| Unit (mm) | Width | Height | Diagonal (calculated) | Active area |
|---|---|---|---|---|
| PL-B741F | 8.57 | 6.86 | 10.98 | 58.79 |
| Nikon 1/CX | 13.20 | 8.80 | 15.86 | 116.16 |
| Four Third | 17.30 | 13.00 | 21.64 | 224.90 |
| Foveon(Sigma) | 20.70 | 13.80 | 24.88 | 285.66 |
| APS-C(Canon) | 22.20 | 14.80 | 26.68 | 328.56 |
| APS-C(Nikon) | 23.60 | 15.70 | 28.35 | 370.52 |
| APS-H(Canon) | 28.70 | 19.00 | 34.42 | 545.30 |
| Full Frame | 36.00 | 24.00 | 43.27 | 864.00 |
| Medium-Format | 48.00 | 36.00 | 60.00 | 1728.00 |

FIG. 5 shows a comparison of sample reflective (backward) scattering patterns to forward scattering patterns, e.g., captured as described above with reference to FIGS. 3A-3E. The reflective scattering patterns are clearer than the forward patterns for the measured bacterial colony.

Figure 6C:
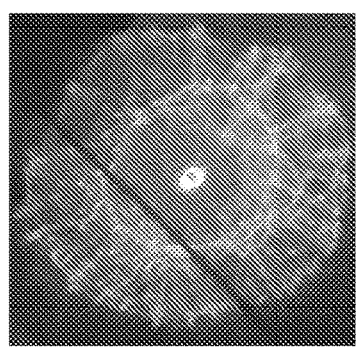
FIGS. 6A-6I show graphical representations of photographs of measured reverse scattering patterns for example bacterial colonies.
Figure 6F:
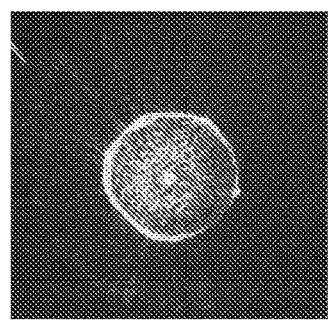
Figure 6I:
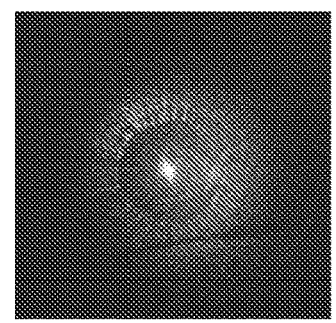
Figure 6B:
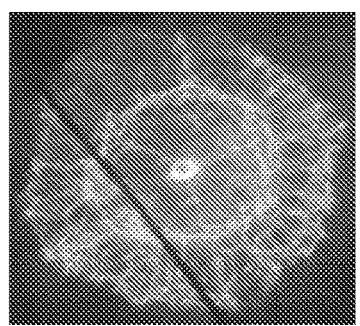
Figure 6E:
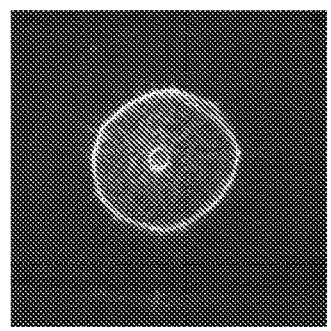
Figure 6H:
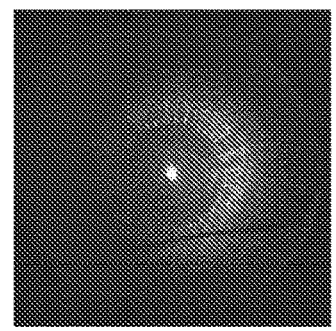
Figure 6A:
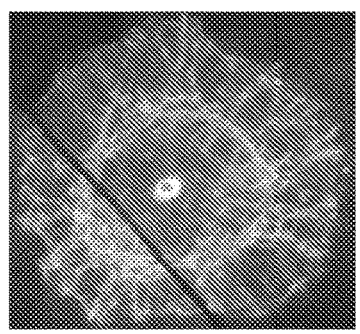
Figure 6D:
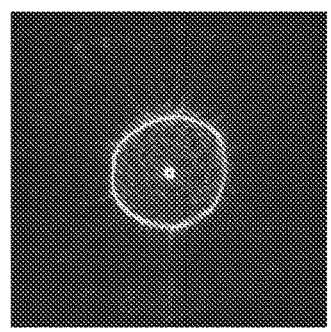
Figure 6G:
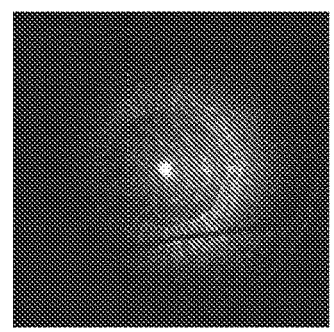

FIGS. 6A-6I show measured reverse scattering patterns measured on TAS blood agar (sheep blood 5%). FIGS. 6A-6C show patterns for *E. coli* K12. FIGS. 6D-6F show patterns for *Listeria* PU12. FIGS. 6G-6I show patterns for *Citrobacter* PU89. As shown, the reverse scattering patterns are qualitatively different between organisms and similar within an organism.

Figure 7:
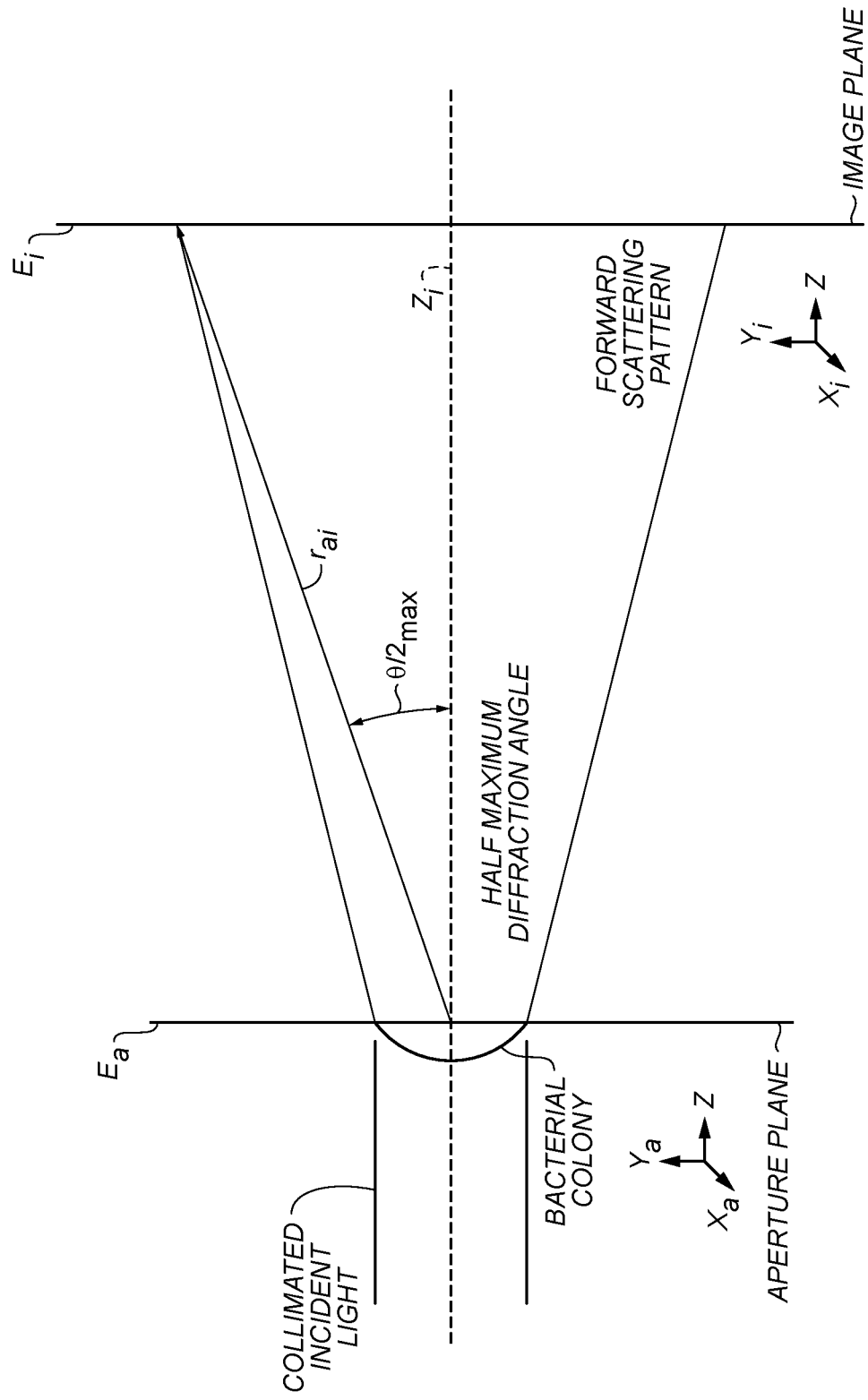
FIG. 7 shows a coordinate system and schematic diagram of an embodiment of forward optical scatter for a bacterial colony.
Figure 9:
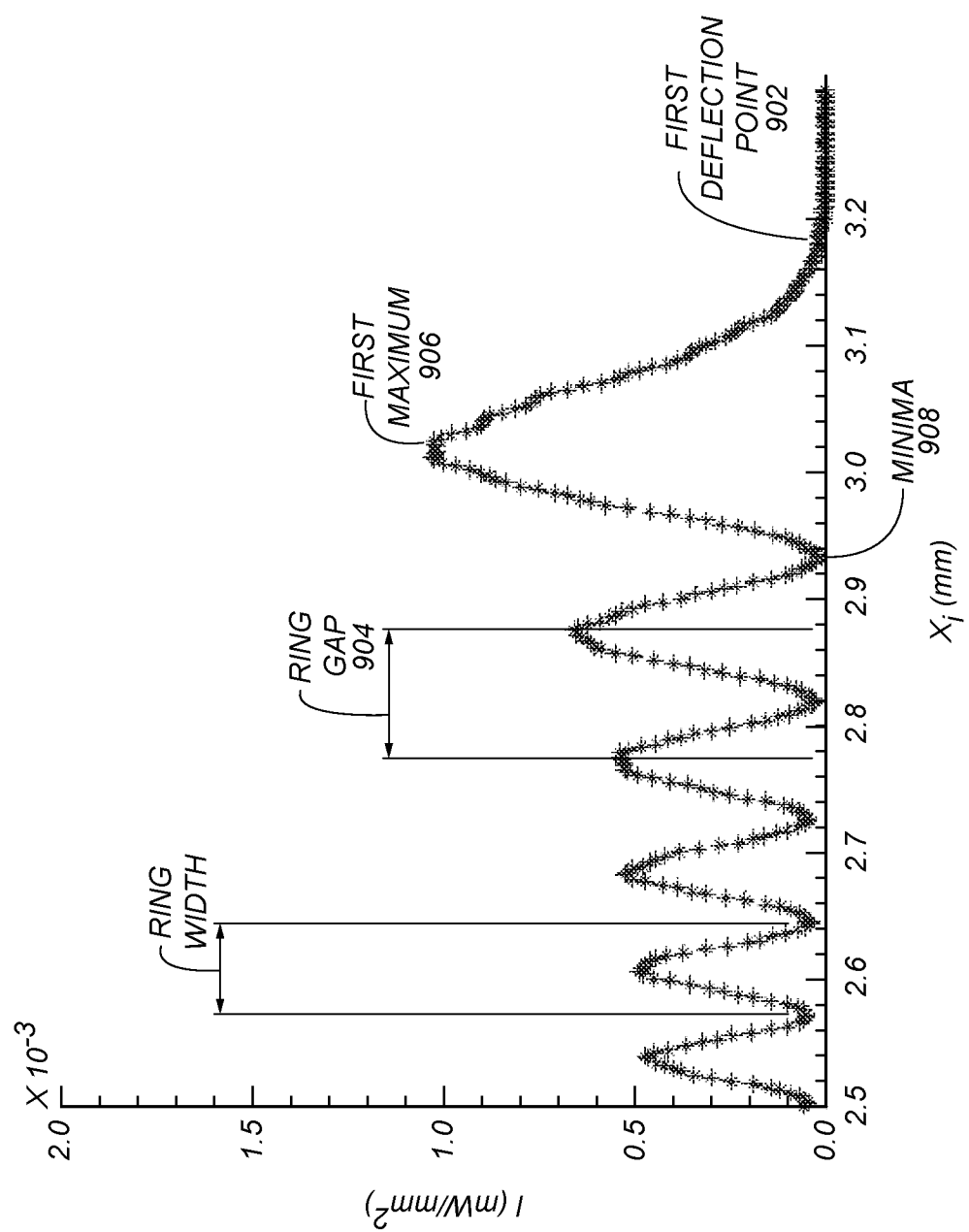
FIG. 9 is a graph showing a simulated intensity profile of a scattering pattern.

FIG. 7 shows a coordinate system and schematic diagram of forward scattering from a bacterial colony. The bacterial colony and a semi-solid media are located at the aperture plane, and the forward scattering pattern is captured at the image plane, which are defined as $(x_a, y_a)$ and $(x_i, y_i)$, respectively. Light propagation direction is defined as the z axis, and the distance between the aperture plane and image plane is defined as $Z_i$. According to optical theory, the diffraction pattern in the image plane is the Fourier transform of the field in the aperture plane. Even though it is a combined result of macro scale (the colony's morphological characteristics) and micro scale (each individual bacteria cell), a macroscopic-only approach is adapted to this modeling whereby the colony is considered as amplitude and phase modulator. A bacteria colony is modeled as the Gaussian-like profile (bell curve shape with tailing edge) as Eq. 1:

$$\text{Colony}(x_a, y_a) = H_0 \exp\left[-\frac{(x_a^2 + y_a^2)}{r_c^2}\right] = H(x_a, y_a) \quad \text{(Eq. 1)}$$

where $H_0$ and $r_c$ are defined as height of center and radius of the colony, respectively. The ratio between $H_0$ and $2 \times r_c$ is defined as aspect ratio. In a simulated example, 1:7 was selected as being a representative aspect ratio for *S. aureus*.

Based on the Fresnel approximation formula, a TEM00 mode of an incident laser beam induces an electrical field $E_a$ at the aperture plane, as in Eq. 2:

$$E_a(x_a, y_a, z) = E_0 \exp\left[-\frac{(x_a^2 + y_a^2)}{\omega^2(z)}\right] \exp(ikz) \exp\left[ik\frac{(x_a^2 + y_a^2)}{2R(z)}\right] \quad \text{(Eq. 2)}$$

where $E_0$ is on-axis strength and the three exp( ) terms are known as the amplitude of the field, the longitudinal phase, and the radial phase respectively.

The quantities $\omega(z)$ and $R(z)$ are beam waist and radius of the wave front, respectively, and are defined as Eq. 3:

$$\omega^2(z) = \omega_0^2\left[1 + \left(\frac{z}{z_0}\right)^2\right], R(z) = z\left[1 + \left(\frac{z_0}{z}\right)^2\right] \quad \text{(Eq. 3)}$$

where $z_0$ is defined as the Z location where the $1/e^2$ radius has expanded to $\sqrt{2}$ times the beam waist $\omega_0$.

Using the Huygens-Fresnel principle in rectangular coordinates, the Fresnel-Kirchhoff diffraction formula, and the First Rayleigh-Sommerfeld solution, the electric field at the image plane $E_i$ induced by the $E_a$ is derived as Eq. 4:

$$E_i(x_i, y_i) = \frac{1}{i\lambda} \int\int t(x_a, y_a) E_a(x_a, y_a) \exp[ik\Phi(x_a, y_a)]\frac{\exp[ikr_{ai}]}{r_{ai}} \cos\theta dx_a dy_a \quad \text{(Eq. 4)}$$

where $t(x_a, y_a)$ is the 2D transmission coefficient, $\Phi(x_a, y_a)$ is the 2D phase modulation factor, $r_{ai}$ is the distance between the aperture plane and a point on the image plane, and $\theta$ is angle between vectors $\vec{z}$ and $\vec{r_{ai}}$, which is calculated as $r_{ai}/Z_2$.

With the Fresnel approximation based on a binomial expansion of the square root, $r_{ai}$ can be as in Eq. 5:

$$r_{ai} = [z_i^2 + (x_a - x_i)^2 + (y_a - y_i)^2]^{\frac{1}{2}} \quad \text{(Eq. 5)}$$
$$\square z_i\left[1 + \frac{1}{2}\left(\frac{x_a - x_i}{z_i}\right)^2 + \frac{1}{2}\left(\frac{y_a - y_i}{z_i}\right)^2\right]$$

Accordingly, in the illustrated example, the electric field at the image plane is expressed as Eq. 6:

$$E_i(x_i, y_i) = C\iint T(x_a, y_a)\exp[i\Phi_r]\exp[i\Phi_c]\exp[i\Phi_g]\exp[-2\pi i(f_x x_a + f_y y_a)]dx_a dy_a \quad \text{(Eq. 6)}$$

where T is the amplitude modulator; $f_x$ and $f_y$ are defined as $x_i/(\lambda Z_2)$ and $x_i/(\lambda Z_2)$, known as a spatial frequency; $\Phi_r$, $\Phi_q$, and $\Phi_g$ are radial-, quadratic-, and Gaussian-phase components, respectively. The latter are defined as in Eqs. 8-10, below. The summation of these phase components is functions as phase modulator for the propagating light.

The amplitude modulator T is as in Eq. 7:

$$T(x_a, y_a) = \exp\left[-\frac{(x_a^2 + y_a^2)}{\omega^2(z)}\right]\frac{E_{out}}{E_0} = \exp\left[-\frac{(x_a^2 + y_a^2)}{\omega^2(z)}\right](1 - r_{air-bac})(1 - r_k)^{2l}(1 - r_{bac-agar}) \quad \text{(Eq. 7)}$$

The model includes the amplitude modulator $T(x_i, y_i, \lambda)$ and a phase modulator $\Phi_{overall}$, the latter of which comprises $\Phi_c$, $\Phi_q$, and $\Phi_r$, which are defined as the colony-, quadratic-, and Gaussian-phase components, respectively, in Eqs. 8-10:

$$\Phi_r(x_a, y_a) = \frac{k(x_a^2 + y_a^2)}{2R} \quad \text{(Eq. 8)}$$

$$\Phi_q(x_a, y_a) = \frac{k(x_a^2 + y_a^2)}{2z_i} \quad \text{(Eq. 9)}$$

$$\Phi_g(x_a, y_a) = k(n_1 - 1)H_0 \exp\left[-\frac{(x_a^2 + y_a^2)}{r_c^2}\right] \quad \text{(Eq. 10)}$$

A cross section of bacteria colony accumulates with densely packed multiple layers of bacteria cell, and is covered with extracellular materials with an overall thickness of $\Delta$. In reality, propagating light is attenuated by both reflections and absorptions, however, only normal incident reflection is assumed to be a major contributor of the intensity loss in this modeling.

The coefficient of Eq. 6, C, is derived as in Eq. 11:

$$C = \frac{E_0 \exp(ikn_{agar}\Delta_{agar}) \exp(ikH_0) \exp[ik(z+z_i)] \exp[ik(x_i^2+y_i^2)/2z_i]}{i\lambda z_i} \quad \text{(Eq. 11)}$$

where $\Delta_{agar}$ and $n_{agar}$ are defined as the thickness of agar and the refractive index of agar, respectively.

The attenuation of the $k^{th}$ layer of bacteria cells is modeled as Eq. 12:

$$E_{k+1} = E_k(1 - r_k) \quad \text{(Eq. 12)}$$

where $r_k$ is the reflection coefficient for the $k^{th}$ layer and is assumed to be identical for all the cells.

The other reflective coefficients for the air-bacteria cell interface, $r_{air-bac}$ and the bacteria cell-agar interface, $r_{bac-agar}$ are defined as in Eq. 13:

$$r_{air-bac} = \left|\frac{n_{air} - n_{bac}}{n_{air} + n_{bac}}\right|, r_{bac-agar} = \left|\frac{n_{bac} - n_{agar}}{n_{bac} + n_{agar}}\right|, r_k = \left|\frac{n_{bac} - n_{ec}}{n_{bac} + n_{ec}}\right| \quad \text{(Eq. 13)}$$

where $n_{air}$, $n_{bac}$, $n_{ec}$, $n_{agar}$ are the refractive indices of air, the bacteria cell, the extracellular material, and agar, respectively.

As the bacteria colony is modeled as a stacked layer structure, l is defined as Eq. 14:

$$l = \frac{ColonyProfile(x_a, y_a)}{\Delta} \quad \text{(Eq. 14)}$$

The intensity of the electric field is calculated via Eq. 15, $$I = \tfrac{1}{2}\varepsilon c |E_i|^2 \quad \text{(Eq. 15)}$$

where c is speed of light in a vacuum, and ε is vacuum permittivity. In this example, all components of the forward scattering modeling, such as amplitude modulator, phase modulator, and coefficient, are influenced by the incident wavelength, the wavelength-induced forward scattering prediction for S. aureus colony is complete.

The multispectral forward scattering pattern of a bacterial colony is modeled as in Eq. 16:

$$E_i(x_i, y_i, \lambda) = C\iint T(x_a, y_a, \lambda) \exp[i\Phi_{overall}(x_a, y_a, \lambda)] \exp[-2\pi i(f_x(\lambda) x_a + f_y(\lambda) y_a)] dx_a dy_a \quad \text{(Eq. 16)}$$

FIGS. 8A-8H shows examples of different measurement modalities for S. aureus. Staphylococcus, in the illustrated example, forms a Gaussian profile shaped colony with smaller aspect ratio (colony height to diameter ratio, 1:6.7), and can provide a circularly-symmetric diffraction pattern, as discussed below. To predict the multispectral forward scattering pattern of Staphylococcus Aureus (S. aureus) colony, morphological and optical bacterial colony characteristics were modeled, and multispectral forward scattering pattern modeling for S. aureus colony using Elastic Light Scattering (ESL) theory was introduced. The scattering pattern modeling included two components, an amplitude and a phase component. Since S. aureus colony has different optical characteristics such as reflective index and Optical Density (OD) depending on the incident wavelength, both amplitude and phase components of the model included wavelength effects on forward scattering patterns. These were predicted, in a simulated example, as a combination form of these components. As described herein, diffraction ring width, gap, maximum, minimum, and the first deflection point, which were directly related with pattern size were defined. In various tested and simulated examples, longer incident wavelength induced wider ring width and gap, and smaller pattern and smaller numbers of rings, while, shorter incident wavelength formed smaller ring width and gaps with larger pattern size, and larger numbers of rings.

FIG. 8A shows a camera image of a tested plate. FIG. 8B shows a plot of 3D colony morphology. FIG. 8C shows colony optical density. FIG. 8D shows a phase contrast microscope image (PCM) of the colony. FIG. 8E to 8G show measured spectral forward scattering patterns of an *S. aureus* colony for 405 nm, 635 nm, and 904 nm, respectively. Diameter of the measured *S. aureus* colony was 792 um, and verified by both PCM and ICMA. As FIGS. 8B and 8H show, height of sample *S. aureus* colony was 120 μm, and the aspect ratio of the colony was computed as 1:6.7. These spectral scattering patterns display periodic and circularly symmetric ring patterns, while the size of the pattern, and the width and gaps of each ring vary depending on the interrogating wavelengths.

FIG. 8H shows the cross sectional morphology and OD profile at the center region of the sample *S. aureus* colony. The cross sectional morphology of the colony was similar to a bell curve shape, while OD showed a Gaussian shape with a raised center area, a shoulder near the center area, and a sharply increasing slope near edge area, which means optical properties of the tested colony are not proportional to the morphology. The OD of BHI agar was measured to be approximately 0.2 using ICMA light source (675 nm), while the maximum OD of the colony was measured as 0.64.

FIG. 9 shows example simulation data labeled with definitions of components for multi spectral forward scattering pattern analysis. Several parameters of scatter patterns can be defined, such as the first deflection point, ring gap, and ring width (FIG. 9). First deflection point 902 is defined as the outermost point of the pattern and correlates with the diameter of the scatter patterns. Ring gap 904 is defined as the distance between adjacent maxima and minima, e.g., as shown. Due to the asymptotically decreasing intensity at the edge, it is difficult to choose a first deflection point in a consistent manner. Therefore, the location of the first deflection point 902 can be computed by adding the distance between the first maximum point 906 (determined starting from the outside of the pattern and moving towards the center) and the first minimum point 908 (likewise defined) to the location of the first maximum point 906.

For the simulation, the diameter of the colony was assumed to be 800 μm, the height of the colony was assumed to be 120 μm, the distance in between the aperture and image planes was assumed to be 46 mm, and the diameter of the beam at incidence on the colony was assumed to be 1 mm. Refractive index of the *S. aureus* cell along the incident wavelength was assumed to be that of a thin cellulose film, a polymeric organic compound with the basic (monomeric) formula $C_6H_{10}O_5$, for 400 nm to 900 nm incident light, i.e. from 1.4850 to 1.4524, respectively. The reference refractive index was curve fitted using a two term power equation, e.g. Eq. 17:

$$f(x) = ax^b + c \quad \text{(Eq. 17)}$$

with coefficients of 2.486E-08, −1.789, and 1.455 for a, b, and c, respectively, with the goodness of fit according to SSE, R-square, and RMSE being 9.226E-07, 0.9995, and 0.0001386, respectively.

FIGS. 10A-D show example analyses of spectral forward scattering pattern for a bacteria colony. In particular, FIG. 10A shows the computed results for the number of rings (squares, Eqs. 19, 21) and half-diffraction angle (triangles, Eq. 18, 20) of the predicted model plotted against wavelength. The number of the rings decreases from 113 at 400 nm to 47 at 900 nm (a 57% decrease). Similar to the location of the first minimum point (FIG. 10B), the computed half-maximum diffraction angle also decreases from 0.048 to 0.0462 rad (a 3.7% decrease) for the incident wavelength shift from 400 nm to 900 nm. Both the number of rings and half diffraction angle are inversely proportional to the incident wavelength.

$$\theta/2_{max} = \frac{1}{k}\left(\frac{d\Delta\Phi}{dr}\right)_{max} \quad \text{(Eq. 18)}$$

-continued $$N_{ring} = \frac{\Delta\Phi_{max}}{2\pi} \quad \text{(Eq. 19)}$$

$$\theta(\lambda)/2_{max} = \frac{1}{k}\left(\frac{d\Delta\Phi_{overall}(\lambda)}{dr}\right)_{max} \quad \text{(Eq. 20)}$$

$$N_{ring}(\lambda) = \frac{\Delta\Phi_{overall}(\lambda)_{max}}{2\pi} \quad \text{(Eq. 21)}$$

Figure 10A:
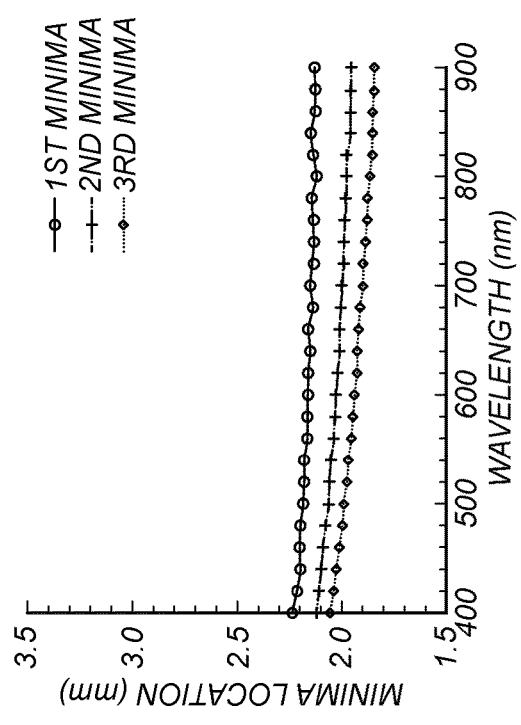
FIG. 10A is a graph showing simulated numbers of rings and half diffraction angles for various incident wavelengths.
Figure 10B:
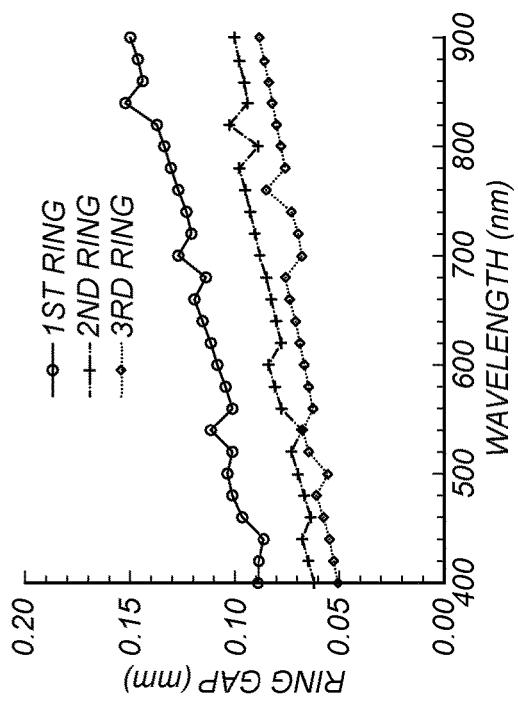
FIG. 10B is a graph showing simulated locations of first to third minima.
Figure 10C:
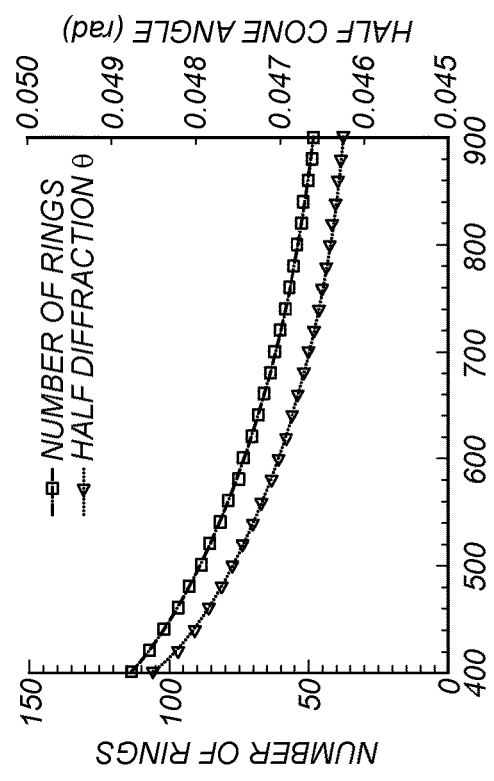
FIG. 10C is a graph showing simulated dimensions of the ring width.
Figure 10D:
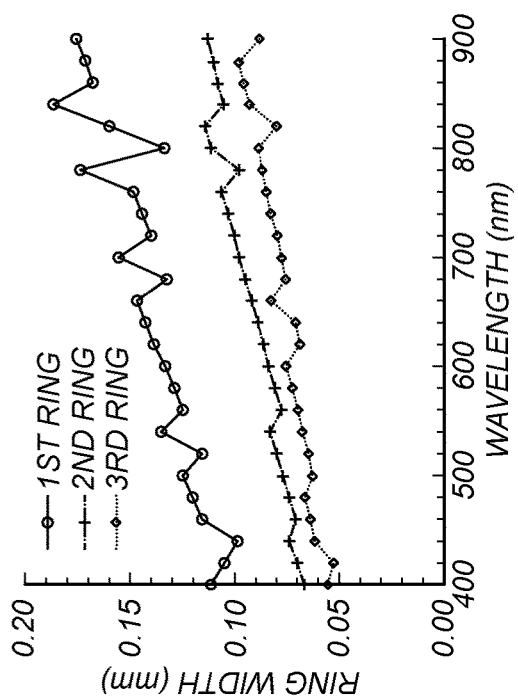
FIG. 10D is a graph showing simulated dimensions of the ring gap.

FIG. 10B shows the spectral dependence of the location of the first to third minima, while FIG. 10C shows the widths of the first through third rings, and FIG. 10D shows the ring gap. Both the number of rings and half diffraction angle were inversely proportional to the incident wavelength, while ring width and gap were proportional to the incident wavelength. Each local maximum and minimum point was automatically found from the predicted patterns, and the ring width and the ring gap were computed based on the location of these local maxima and minima. The locations of the minimum points decrease with increasing wave length, while the ring width and ring gap increase with longer wavelength. Since the first minimum point is defined as the first deflection point, and that determines the pattern size, the pattern size decreases by 4.4% from 400 nm to 900 nm, and is inversely proportional to the incident wavelength. Ring width and ring gaps increase by 40.1%, and 40.8%, respectively, with increasing wavelength from 400 nm to 900 nm of the incident light, and are proportional to the wavelength. Second and third ring widths and ring gaps showed similar trends to those of the first ring case.

In an experiment that was performed, *Staphylococcus aureus* ATCC 25923 was inoculated and grown on a BHI agar for 14.5 hours at 37°. While 10-30 colonies appeared on the surface of the agar, 5-10 colonies were selected that had grown closer to 1 mm diameter. Then multispectral BAR-DOT captured the forward scattering patterns in all three wavelengths and spectral OD simultaneously, e.g., as described above with reference to FIG. 2.

FIG. 11 shows an example comparison of spectral forward scattering pattern prediction and experimental results of *S. aureus* ATCC25923 as measured by one embodiment of a measurement instrument as described herein. FIGS. 11A and 11B show 1D cross sections of spectral diffraction patterns while FIGS. 11C and 11D show 2D patterns. FIGS. 11A and 11C show simulation results; FIGS. 11B and 11D show experimental results. Considering the pixel width of the CMOS camera, the x coordinates of FIG. 11B were converted from pixel to mm scale, and that of y coordinate was converted to normalized intensity by considering the quantum efficiency of CMOS along the incident wavelength. The cross sections of predicted simulation results show wider and sparser periods of patterns for the longer incident wavelength, while the pattern size (the location of the first deflection point) decreases from 4.46 mm to 4.25 mm. The prediction and experimental results showed good agreement. The average of percent error between the spectral prediction and experimental results were computed as 3.54% (pattern size), 0.04% (location of the first to third maxima), and 7.66% (ring width).

Theoretical calculation of the forward scatter patterns were conducted using a diffraction model based on Rayleigh-Sommerfeld and Fresnel diffraction theory. The bacteria colonies were modeled as bell curves with tailing edge profiles, which is modeled as an amplitude and phase modulator. *Staphylococcus aureus* ATCC 25923 is known for its concentric ring patterns, and high aspect ratio of 1:5 for center height to colony diameter ratio. Here the spectral effect was analyzed via utilizing the variation of the refractive index of bacteria versus the interrogating wavelength. The results are shown in FIG. 11A, which displays the comparison of the theory (11A) and experiment (11B) from *S. aureus*. The general trend shows that as the wavelength increases from 405 to 904 nm, the overall pattern size decreases by 4.376% and 4.35% for model and experiment, respectively. The ring gap and ring width increased 44.17% and 45.02% for the theoretical model, and 40.16% and 41.27% in the experimental results. The number of peaks and their locations showed excellent agreement between the theory and experiment.

Figure 12:
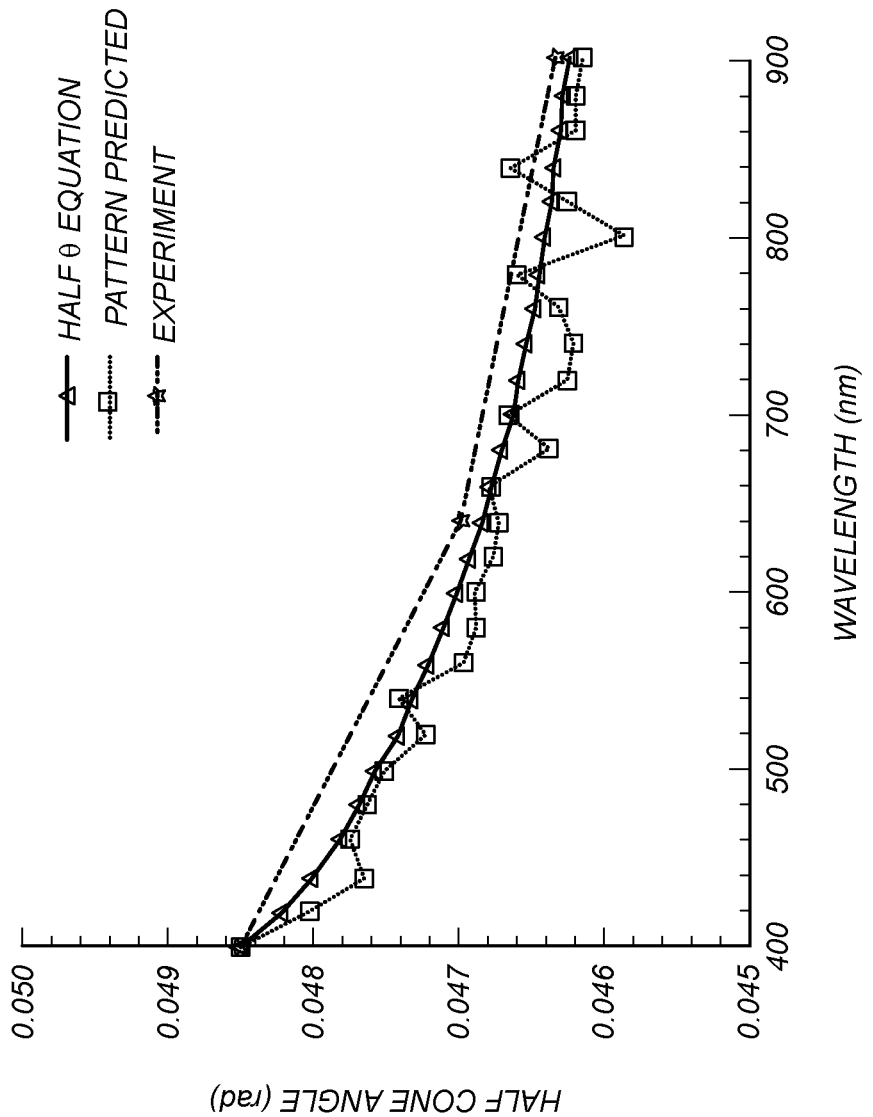
FIG. 12 is a graph showing a comparison of simulated and measured spectral half diffraction angles.

FIG. 12 shows the comparison of spectral half diffraction angle which compares experimental results with two different theoretical results. The first value utilizes the half diffraction angle formula (Eqs. 18, 20, triangles), the second value is the calculated pattern diameter from the proposed multispectral model (square), and the third is experimental results from *S. aureus* (hexagon). As FIG. 12 indicates, all three methods show that longer wavelength induces a smaller diffraction angle and thus smaller diameter than the short wavelength patterns.

Figure 13:
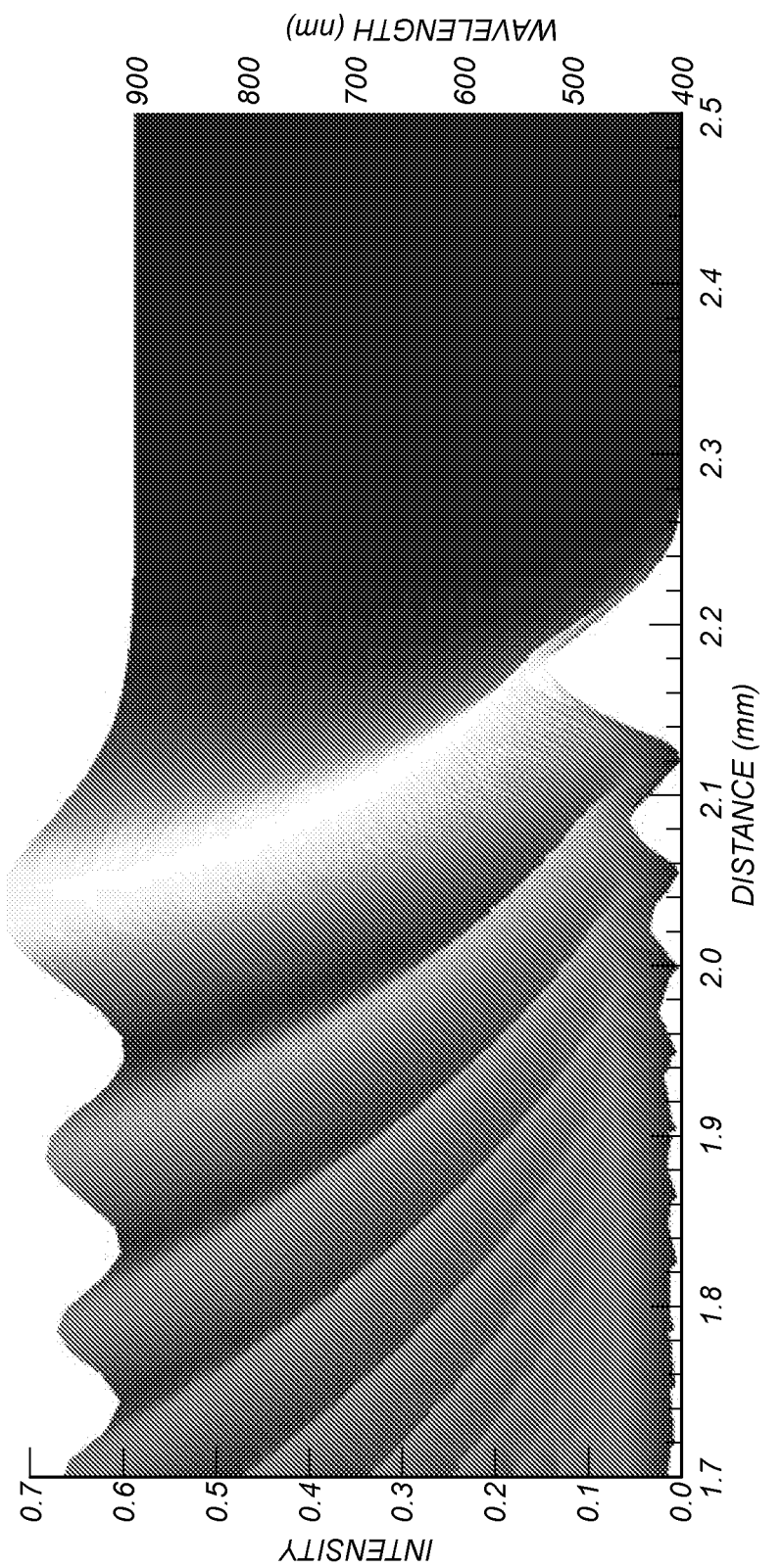
FIG. 13 is a graph showing a comparison of intensity profiles of simulated spectral diffraction patterns.

FIG. 13 shows a comparison of cross sectional views of the spectral diffraction pattern near the outermost boundary of the predicted patterns. The X axis represents the lateral direction of the pattern, the Y axis represents the wavelength, and the vertical offset and shading represent the intensity of the pattern (lighter shading=higher intensity). Longer wavelength incident light induces a smaller pattern size, wider ring width and gaps, and fewer rings in the diffraction pattern for *S. aureus* colony.

FIGS. 14A and 14B depict beam paths from light sources 106 to photodiode 114 and sensor 112 for forward scattering mode, and from light sources 106 to photodiodes 114, 216 for OD measurement mode, respectively (all FIG. 1). FIGS. 14A and 14B show example beam paths, and show how the beam is reflected and transmitted from a light source to each sensor (photodiode or imager) through the pellicle beam splitter. Since pellicle beam splitters, photodiodes, CCD sensors, and CMOS sensors used in cameras can have inherent optical response characteristics such as spectral reflectance, transmittance and quantum efficiency, the light intensities and sensitivity of the each sensors can be calibrated and compensated for using both optical and electric means to maintain similar input intensities for each wavelength.

Figure 15B:
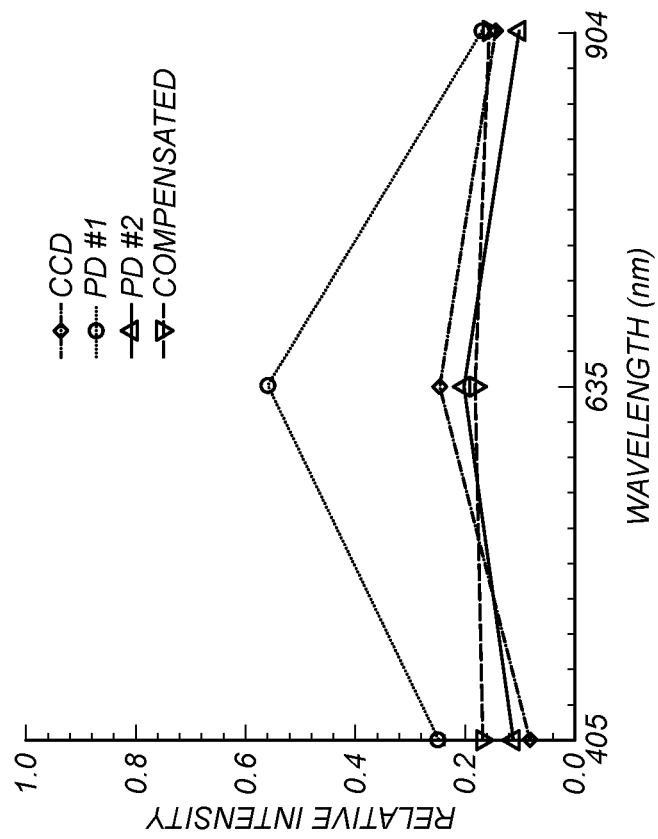
FIG. 15B is a graph showing relative intensities of various wavelengths of a tested example irradiation system.
Figure 15A:
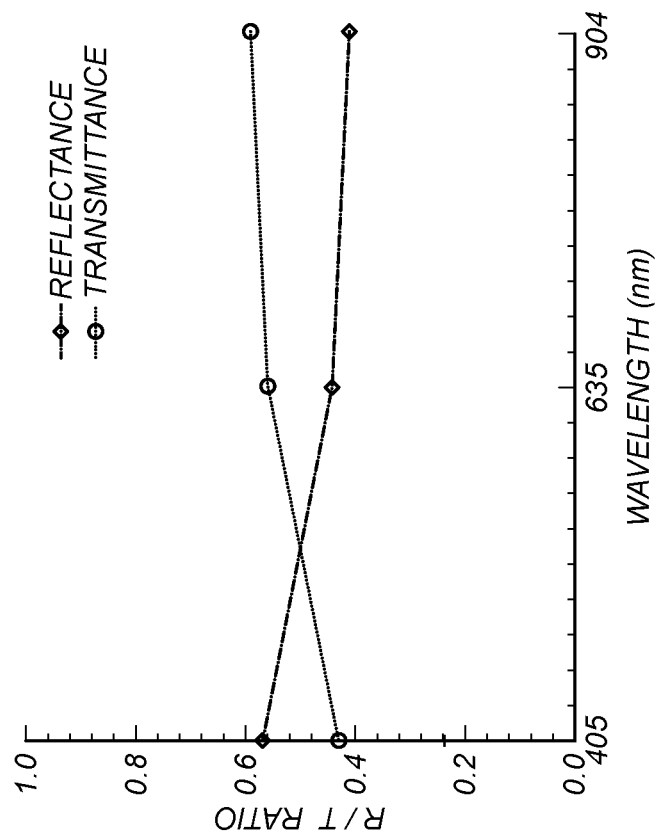
FIG. 15A is a graph showing optical properties of a measured pellicle beamsplitter.

FIG. 15A shows experimental reflectance (R) and transmittance (T) ratios of a nominally R45:T55 pellicle beam splitter. The data are R56.8:T43.1, R44.3:T55.7, and R40.9:T59.0 for 405 nm, 635 nm, and 904 nm respectively.

Overall attenuation by the beam splitter units from 405 nm, 635 nm, and 904 nm laser sources to CMOS was experimentally determined to be 0.0805, 0.2468, and 0.1428; to PD #1 was 0.2454, 0.5570, and 0.1679; to PD #2 was 0.1060, 0.1963, and 0.0991 respectively. These values were determined using a commercial laser power meter (Coherent, Fieldmate, CA, USA).

FIG. 15B shows wavelength-resolved intensity compensation factors for the sensors. These compensation factors can be used to compensate for differences between the quantum efficiencies of various sensors and between the attenuation ratios of the beam splitters. For example, the power of each source 108 can be divided by its relative intensity at a corresponding wavelength to normalize the source powers to unit.

*Escherichia coli* O157:H7 EDL933, *Listeria monocytogenes* F4244, *Salmonella enteritidis* PT21 and *Staphylococcus aureus* ATCC 25923 were selected as model organisms for the experiments. For the agar plate preparation, all cultures were grown in 5 ml brain heart infusion (BHI) (Difco, MD, USA) broth for 15 h at 37° C. at 130 rpm in an incubator shaker. After incubating, the cultures were serially diluted and surface plated on BHI agar plates (100 mm×15 mm) to achieve a bacterial counts of 50-100 CFU/plate. The plates were incubated at 37° C. until the size of the colonies reached a diameter range of 900~1100 μm. The diameters of the bacterial colonies were measured using both a bright-field microscope (Leica Microsystems, Bannockburn, Ill., USA) equipped with CCD camera (Leica Microsystems, Leica DFC310 FX, Bannockburn, Ill., USA) and Leica Application Suite V4.20 build 607 (Leica Microsystems, Bannockburn, Ill., USA) using a 10× objective, and the multispectral BARDOT described herein. For 1000 μm colony diameter of each genus bacteria, 10.5 h, 22.5 h, 11.5 h, and 13.5 h were used for culturing *E. coli*, *Listeria*, *Salmonella*, and *S. aureus*, respectively. The thickness of the agar of each plate was maintained at approximately 8 mm.

For the liquid sample preparation, a pure colony of each genus was harvested and diluted in a single tube, and incubated for 12 hrs at 37° C. Then, aliquots of the samples were transferred to a disposable cuvette and each stock was serially diluted 3 times at 1:10 ratio. ODs of the diluted samples at 300-800 nm were measured with a DU 800 spectrophotometer (Beckman Coulter Inc., CA, USA). Spectral absorption curves were recorded three times for each of 5 different samples (total 15 data sets) for each genus, and average spectral response curves were calculated. For quantitative comparison, the area under the curve was calculated and this was used for normalization.

For the solid sample experiments, 5 plates of each genus were prepared for a single-day dataset, and repeated on three different days in order to accommodate the biological variability. At least 20 points and colonies were measured per plate for only the BHI agar area and the bacteria colony respectively. The spectral OD of BHI agar is defined as in Eq. 22:

$$OD_{agar}(\lambda) = -\log_{10}\left(\frac{I(\lambda)_{agar}}{I(\lambda)_{input}}\right) \quad \text{(Eq. 22)}$$

where $I(\lambda)$ refers to the intensity of light or other output of the photodiode at wavelength $\lambda$. The intensity can be expressed, e.g., in volts or digital representations of volts. The mean value of each OD was computed as 0.503, 0.129, 0.072 for 405 nm, 635 nm, and 904 nm respectively. Since it is difficult to measure the actual OD of the bacterial colony without destroying the colony structure on semi-solid agar, an indirect method can be used to obtain the OD of the bacteria colony. OD of the colony was computed as in Eq. 23:

$$OD_{colony}(\lambda) = -\log_{10}\left(\frac{I(\lambda)_{agar+colony}}{I(\lambda)_{input}}\right) - OD_{agar}(\lambda) \quad \text{(Eq. 23)}$$

Since the first term of the right side of the (Eq. 23) is the combined OD of BHI agar and the colony, the OD of agar can be subtracted to obtain the attenuation from the colony only.

An experiment was performed using *Staphylococcus aureus* ATCC 25923 (*S. aureus*). For agar plate preparation, the frozen *S. aureus* stock was streaked on BHI agar plate, and grown at 37° C. incubator for 13 h. A single *S. aureus* colony was collected with a sterilized loop, and grown in 5 ml brain heart infusion (BHT) (Difco, MD, USA) broth for 15 h at 37° C. at 130 rpm in an incubator shaker to maintain a purity of the culture. After incubating, the cultures were serially diluted and surface plated on BHI agar plate (100 mm×15 mm) to achieve bacterial counts of 50-100 CFU/plate. The plates were incubated at 37° C. until the size of the colonies reached a diameter range of 800~1100 nm. 13-15 h of incubation time was necessary to achieve this colony diameter. The diameters of the bacterial colonies were measured using both a bright-field microscope (Leica Microsystems, Bannockburn, Ill., USA) equipped with CCD camera (Leica Microsystems, Leica DFC310 FX, Bannockburn, Ill., USA) and Leica Application Suite V4.20 build 607 (Leica Microsystems, Bannockburn, Ill., USA) with a 10× objective, and ICMA (Integrated Colony Morphology Analyzer, Purdue University, IN, USA). The agar thickness of each plate was kept at 8 mm to maintain similar conditions between duplications.

FIGS. 16A-B and FIGS. 17A-D compare the spectroscopic OD measurements for liquid and solid samples. This information can be used for the selection of the best discriminative wavelength region. For example, *S. aureus* showed almost ⅓ higher OD than *L. mono* at 400 nm wavelength. For the four tested genera, the selected wavelengths of 405 nm, 635 nm and 904 nm provide measurable differences in spectral absorption at those wavelengths. OD was also measured for solid samples. All genera showed monotonically decreasing OD trends as the wavelength increased except for *S. aureus*. By nature, liquid samples are more homogenously spread out through the whole volume, so only the individual cell shape or other particulates can be argued as the contributing factors for the observed difference. However, in solid samples, growing microbial films (bacterial colonies) have more characteristic information beside the individual cell shape. For example, *E. coli*, *Listeria* and *Bacillus* cells are all rod-shaped, but their colony characteristics show dramatic differences. In addition, nutrition, agar hardness, and environmental factors can change the morphology of the solid colony. Therefore, an instrument such as multi spectral BARDOT that can capture the multimodal characteristics of a colony can better provide differentiable traits from a given bacterial sample.

Figure 16B:
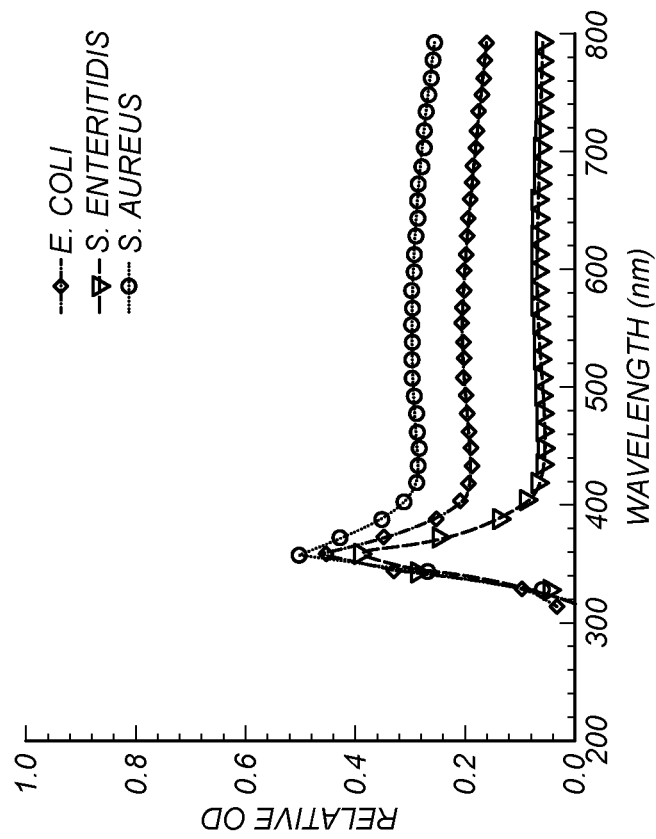
FIG. 16B is a graph showing relative optical density of the measurements of FIG. 16A.
Figure 16A:
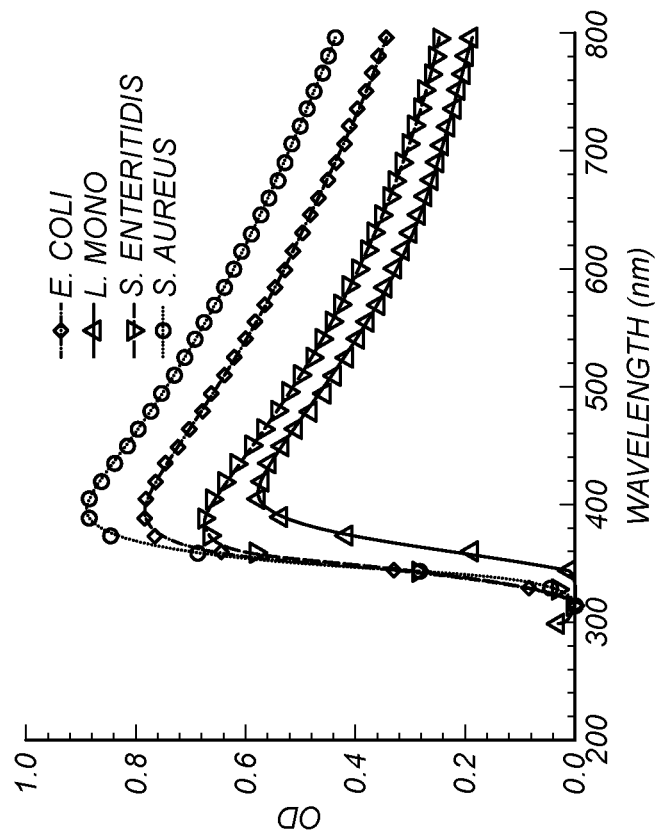
FIG. 16A is a graph showing optical density measurements that were collected of example bacterial colonies.

FIG. 16A shows spectral absorption (OD) measurements of *E. coli*, *L. mono*, *S. enteritidis*, and *S. aureus* in liquid BHI stock (300-800 nm range) at a 1:100 dilution. All the genera showed peak OD values near 400 nm, and ODs gradually decreased with increasing wavelength. *S. aureus* had the highest OD value, while *L. mono* had the lowest OD value among the tested genera. Different genera of bacteria showed different spectral OD for incident wavelength, and wavelengths were selected to provide effective OD discrimination.

FIG. 16B shows the relative OD values of the interrogated genera with respect to *L. mono*. Shown are spectral absorption measurements representing relative spectral optical density (OD) of common pathogens, *Escherichia coli* O157:H7 EDL933, *Salmonella enteritidis* PT21, and *Staphylococcus aureus* ATCC25923, to *Listeria monocytogenes* F4244. The vertical lines stand for example wavelengths of the employed laser diode (LD). The 405, 635, and 904 nm laser lines were selected on the basis of line separation which provided selected levels of OD difference between the interrogated genera. In various examples, the OD information can be used as a simple classification method for bacteria genera.

In various aspects, three pellicle beam splitters mounted in optical cages can be adopted to avoid a ghost effect from the use of thick plate beam splitters, and to provide improved alignment of the light source and the CMOS camera. In addition, two Si photodiodes (PD) can be included such that laser intensity can be monitored before and after the laser passes the bacterial colony. The ratio of the voltage readings or other data from those photodiodes can provide the spectral OD of the whole colony. Each diode laser can illuminate a bacterial colony sequentially to capture spectral forward scattering images and OD, and overall measurement time for each colony can be 3-4 sec.

FIG. 17A shows the measurement points, where input laser intensity was measured, e.g., at PD 114 (FIG. 1A), while the media with one or more bacterial colonies were measured at PD 216 of FIG. 2.

FIG. 17B illustrates that the spectral absorption from bare agar areas displays similar characteristics to the liquid samples. When the wavelength increases, the OD of the BHI agar decreases.

FIG. 17C illustrates that the net OD ((agar+colony)−agar) from bacterial colonies generally shows a decrease as the wavelength increases. S. aureus shows a peak value of 0.38 for net OD from 635 nm, while S. entertidis shows a value of 0.22 (FIG. 17C). The net OD at 904 nm for all genera was the lowest among the examined wavelengths. When the samples were dissolved in a liquid format, Listeria showed the lowest OD. Compared to the liquid sample result, the OD of L. mono on BHI agar is not the lowest OD through the interrogated wavelengths. S. enteritidis shows the lowest OD at 635 nm and 904 nm. Since single-wavelength OD values provide limited differentiability among genera, three-wavelength combinations of the OD can be utilized as a first step classification method for the tested genera.

FIG. 17D illustrates spectral OD differences calculated to enhance the differentiation of the spectral OD in various aspects. The X-axis represents three combinations of the OD difference (#1=$OD_{405}$-$OD_{635}$, #2=$OD_{405}$-$OD_{904}$, and #3=$OD_{635}$-$OD_{904}$). Using this method, differences between the genera are visually enhanced, and it becomes easy to recognize their OD trend across wavelengths. For instance, S. aureus has a negative OD difference at #1. Other genera show 0 to 0.07 OD difference at #1, which means those genera have similar ODs at 405 nm and 635 nm. At #2, the OD difference between the 405 nm and 904 nm regions, L. mono has the highest OD differences, while S. aureus has the smallest OD difference. E. coli and S. enteritidis have similar OD difference trends at both #2 and #3 combinations.

Figure 18B:
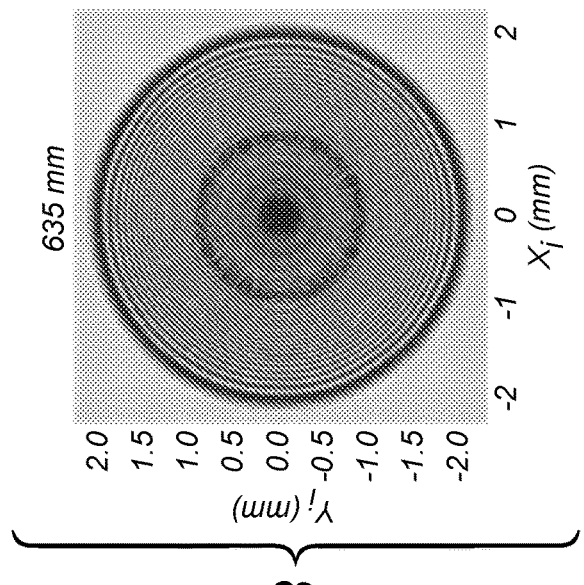
FIG. 18B is a graphical representation of a simulated forward scattering pattern for an example bacterial colony illuminated with 635 nm-wavelength light.
Figure 18D:
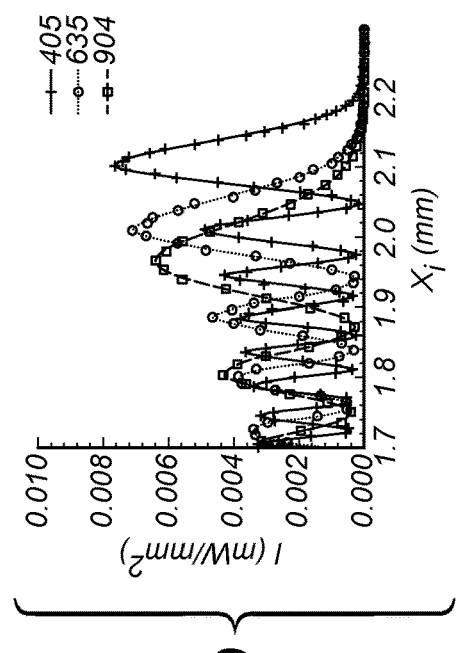
FIG. 18D is a graph showing intensity profiles of simulated scatter patterns.
Figure 18A:
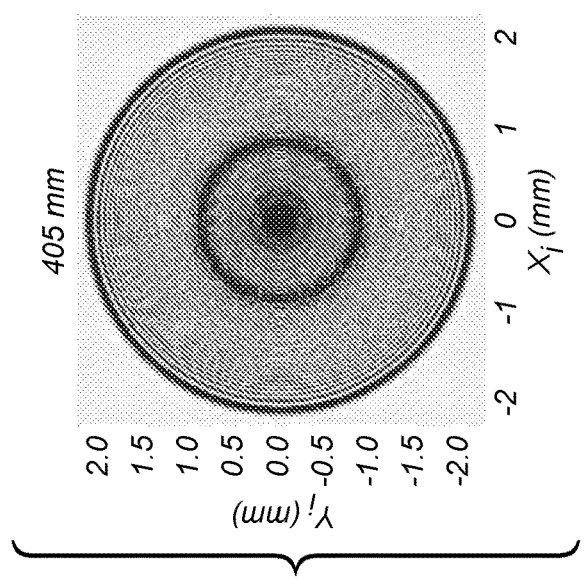
FIG. 18A is a graphical representation of a simulated forward scattering pattern for an example bacterial colony illuminated with 405 nm-wavelength light.
Figure 18C:
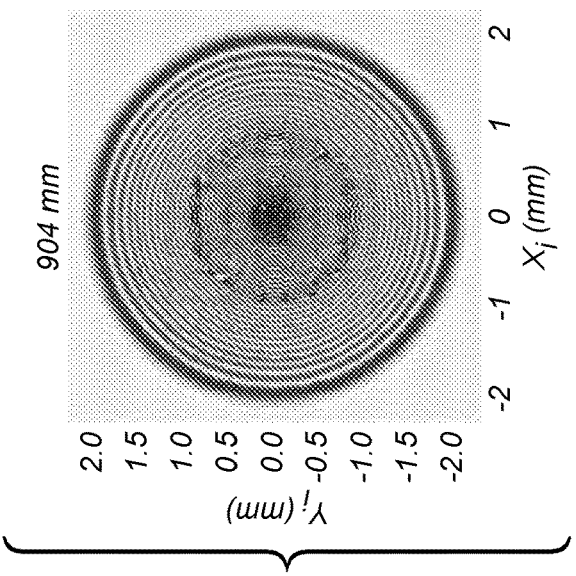
FIG. 18C is a graphical representation of a simulated forward scattering pattern for an example bacterial colony illuminated with 904 nm-wavelength light.

FIG. 18A-18D show prediction results of multispectral forward scattering pattern for a bacterial colony based on spectral ELS modeling. FIGS. 18A-18C are shown with black and white reversed for clarity of presentation. S. aureus is selected as a target micro-organism since it has a bell-curve with tailing edge colony shape and it generates a concentric circle shaped forward scattering pattern. For the prediction, the colony diameter is set at 1000 μm, and the aspect ratio (colony center height to diameter ratio) is set as 1:6.25. The wavelength term is found in both the amplitude and the phase components of the modeling (Eq. 16). As the predicted model shows, the pattern size and the number of rings decrease, while ring width and ring gap increase with longer wavelengths of incident light.

Table 2 shows the computed result for the maximum diffraction angle and the number of diffraction rings from Eq. 20 and 21, and shows a good match with the result from the modeling.

TABLE 2

| λ (nm) | $N_{bac}$ | Half of maximum diffraction angle (rad) | Number of diffraction rings (ea) |
|---|---|---|---|
| 405 | 1.4834 | 0.0483 | 94 |
| 635 | 1.4684 | 0.0468 | 60 |
| 405 | 1.4623 | 0.0462 | 40 |

FIGS. 18A-18C show simulated scattering patterns at 405 nm, 635 nm, and 904 nm, respectively. FIG. 18D shows a cross-sectional view near the boundary region of the predicted patterns.

Figure 19:
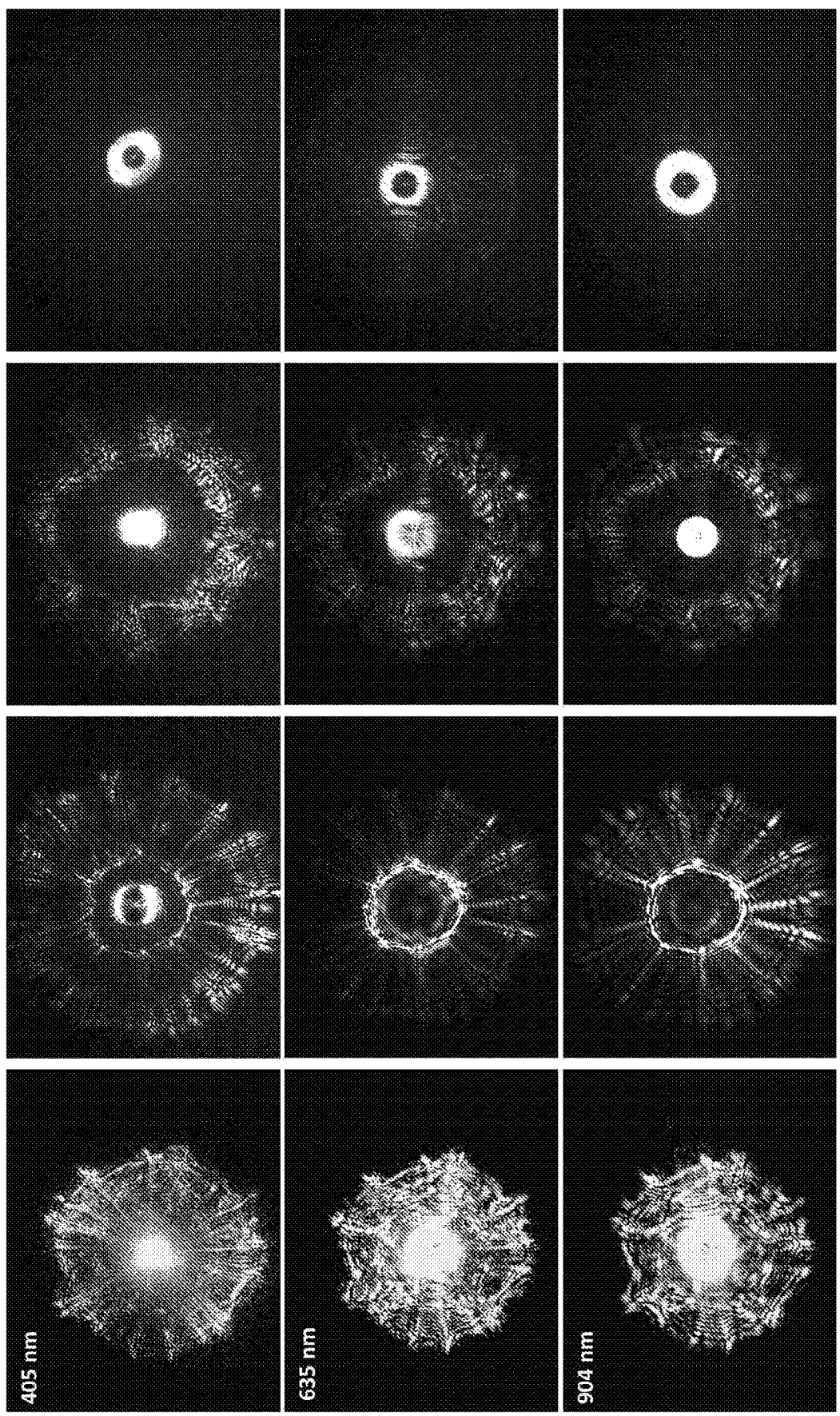
FIG. 19 shows graphical representations of photographs of measured scattering patterns for example bacterial colonies at various wavelengths.

FIG. 19 shows the spectral forward scattering patterns of the four example genera of bacteria on semi-solid BHI agar as measured at three wavelengths by an MS-BARDOT instrument such as described above with reference to FIGS. 1A-5A. The pellicle beam splitter 214 (FIG. 2) permits capturing the forward scattering patterns and the OD of the bacteria colony simultaneously. Visual inspection of the spectral scatter patterns shows qualitative differences in the patterns. Observing the difference along a column of FIG. 19 shows that different bacteria show different prominent patterns. For E. coli and S. enteritis samples, the 405-nm patterns show fine structures of spokes, speckles, and rings, unlike the patterns collected at the other wavelengths. For L. mono samples, the 405-nm pattern has the largest diameter pattern, and the central portion of the pattern indicates higher signal intensity when compared with 635 and 904 nm.

Bacterial colonies have two major regions: edge regions that are generally less dense, have greater water content, and wherein division of cells occurs, and the center part. The pattern information can provide some understanding on how the bacteria are spreading at the edge and how cells are accumulating at the center part. One organism that uniquely stands out is S. aureus. The patterns show very weak rings at the edge, with little detail information that can be extracted (except for 635 nm).

FIG. 20A shows the image of FIG. 19 (spectral forward scattering patterns of S. aureus for 405, 635, and 904 nm) transformed into rectangular coordinates, where X and Y axes represent angle and radius, respectively. This polar pattern representation reveals a clear ripple structure in the 635-nm patterns, while the 405-nm and 904-nm patterns show low intensity outside of the central bright spots. The average intensity across the whole circular regions shows the ripple structure for 635 nm and 904 nm, e.g., for radius values between 75 and 120, though the latter wavelength shows 50% lower average intensity. For 405 nm, average intensity is comparable to the 635 nm patterns, but very small speckle patterns are observed without any ring structures (FIG. 20B).

Figure 21:
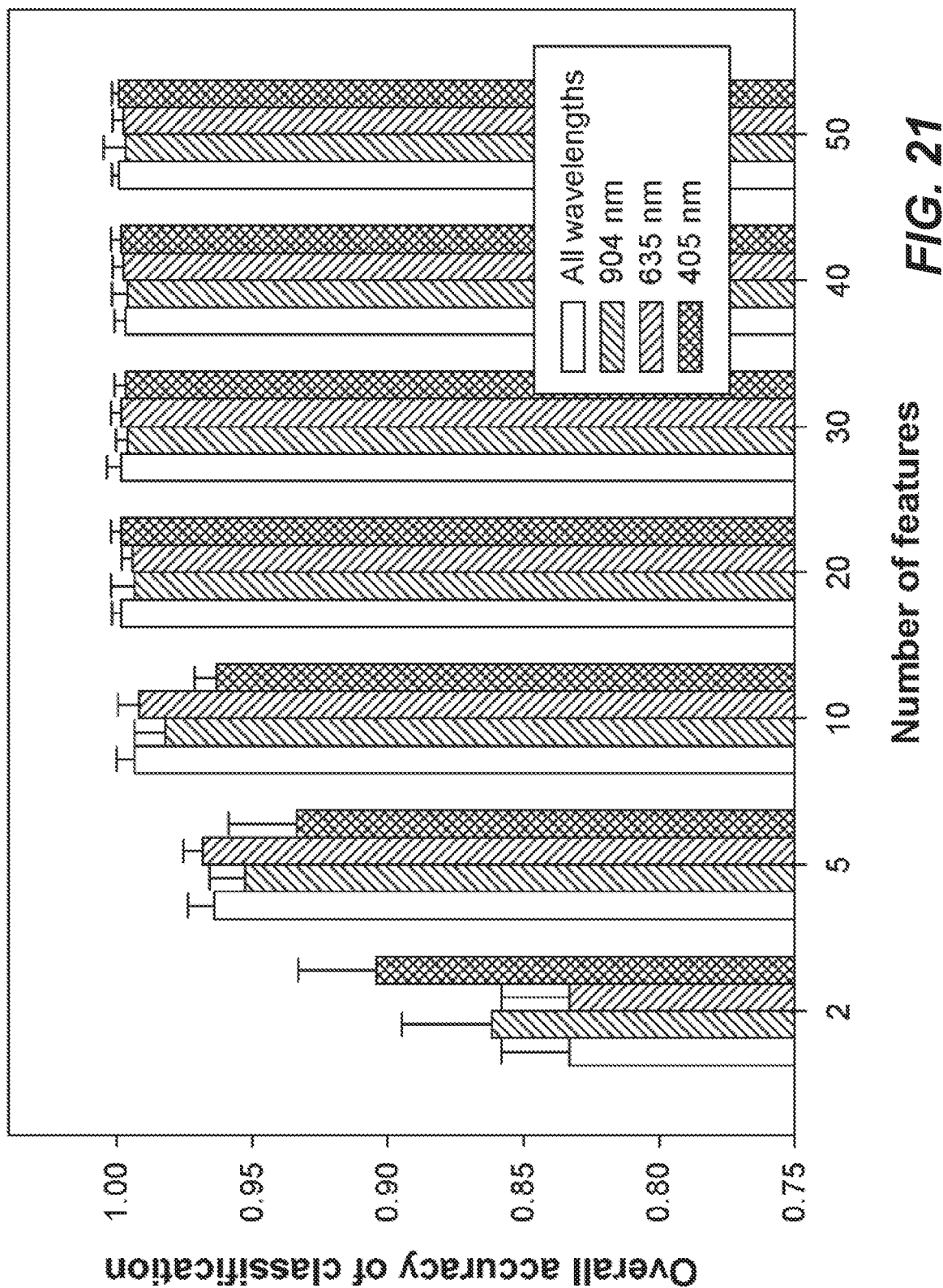
FIG. 21 is a graph showing classification accuracy for various numbers of features.
Figure 22B:
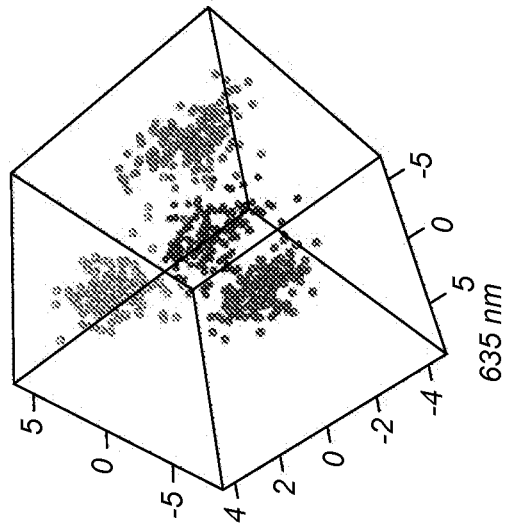
FIGS. 22A-22D are three-dimensional linear-discriminant analysis plots showing feature-space distances between colonies of different types of micro-organisms.
Figure 22D:
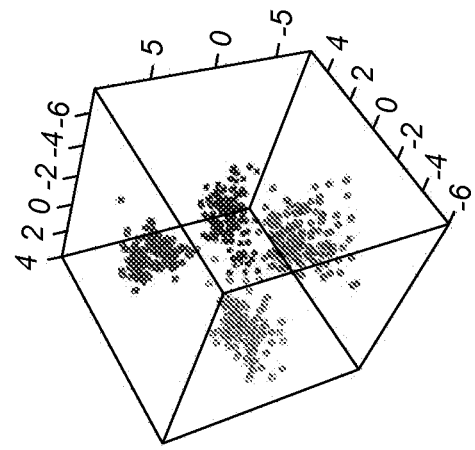
Figure 22A:
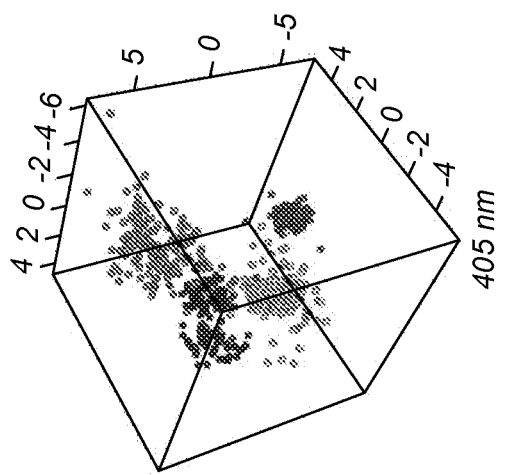
Figure 22C:
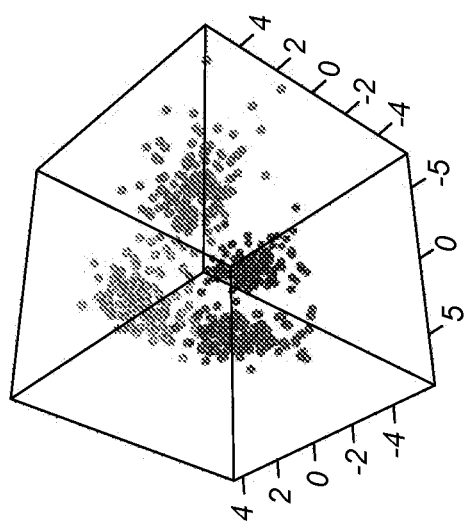

FIG. 21 is a graph showing classification accuracy for various numbers of features.

Multispectral forward scattering pattern and OD based bacterial phenotyping techniques according to various examples herein can measure three different wavelengths (405, 635, and 904 nm) of both forward scattering patterns and ODs for a target bacterial colony simultaneously. Utilizing stackable pellicle beam splitters structure, some examples reduce unexpected optical side effects such as ghost effects. Some examples can be readily expanded to include light sources of additional wavelengths. Using pseudo-Zernike (GPZ) polynomials/moment, the results of the four different bacterial genera were analyzed and classified.

The spectral-scatter patterns were analyzed as described above using GPZ moments as features. In some examples, since three separate laser wavelengths are used, the number of extracted features per colony is three times larger than in a single-wavelength system.

The feature extraction/recognition of scatter patterns was performed using pseudo-Zernike (GPZ) polynomials/moments. The GPZ polynomials are formally defined as in Eq. 24:

$$k_{p\lambda}^\alpha(z) = z^{\frac{p+\lambda}{2}} (z^*)^{\frac{p-\lambda}{2}} \frac{(\alpha+1)_{p-|\lambda|}}{(p-|\lambda|)!_2} \quad \text{(Eq. 24)}$$

$$F_1\left(-p+|\lambda|, -p-|\lambda|-1; \alpha+1; 1-\frac{1}{(zz^*)^{1/2}}\right)$$

where * denotes the complex conjugate and $z=re^{j\theta}$. The parameter $\alpha$ is user-selectable, and scales the polynomial values. The repetition $\lambda$ is set to be between 0 and p.

The polynomial is defined in polar coordinates as in Eq. 25:

$$k_{p\lambda}^\alpha(r,\theta) = k_{p\lambda}^\alpha(re^{j\theta}) = k_{p\lambda}^\alpha(r)e^{j\lambda\theta}, \quad \text{(Eq. 25)}$$

Where the real-values radial polynomial $R_{p\lambda}^\alpha(r)$ is given by Eq. 26:

$$R_{p\lambda}^\alpha(r) = \frac{(p+|\lambda|+1)!}{(\alpha+1)_{p+|\lambda|+1}} \sum_{s=0}^{p-|\lambda|} \frac{(-1)^s (\alpha+1)_{2p+1-s}}{s!(p-|\lambda|-s)!(p+|\lambda|+1-s)!} r^{p-s} \quad \text{(Eq. 26)}$$

The radial polynomial $R_{p\lambda}^\alpha(r)$ is computed using the recurrence relation given in Eq. 27:

$$R_{p\lambda}^\alpha(r) = (M_1 r + M_2) R_{p-1,\lambda}^\alpha(r) + M_3 R_{p-2,\lambda}^\alpha(r), \quad \text{(Eq. 27)}$$

with the following coefficients in Eq. 28:

$$M_1 = \frac{(2p+1+\alpha)(2p+\alpha)}{(p+\lambda+1+\alpha)(p-\lambda)} \quad \text{(Eq. 28)}$$

$$M_2 = \frac{(p+\lambda+1)(\alpha+2p)}{p+\lambda+\alpha+1} + M_1 \frac{(p+\lambda)(p-\lambda-1)}{2p-1+\alpha}$$

$$M_3 = \frac{(p+\lambda)(p+\lambda+1)(2p-2+\alpha)(2p-1+\alpha)}{2(p+\lambda+\alpha+1)(p+\lambda+\alpha)} + + M_2$$

$$\frac{(p+\lambda)(2p-2+\alpha)}{p+\lambda+\alpha} - M_1 \frac{(p+\lambda)(p+\lambda-1)(p-\lambda-2)}{2(p+\lambda+\alpha)}$$

and in Eq. 29:

$$R_{\lambda\lambda}^\alpha(r) = r^\lambda$$

$$R_{\lambda+1,\lambda}^\alpha(r) = [(\alpha+3+2\lambda)r - 2(\lambda+1)]R_{\lambda\lambda}^\alpha(r) \quad \text{(Eq. 29)}$$

Various systems based on monochromatic elastic light scatter produce features which can lead to high classification accuracies. Therefore, performance of various examples can be evaluated using sensitivity and specificity of the tested systems. Consequently, robust increases in classification success in the range of 1-2% can be provided.

In various aspects, feature selection can be based on a random forest algorithm (RF), in which for every run the RF selects a random features subset and generates a classification tree. The importance of the analyzed features can be determined by the accuracy of these trees. In various aspects, the improvement of classification can be related to the increased feature numbers, and the range of 10-20 features can be used (See FIG. 21). In an experiment, 15 was selected as the number of features. After determining the subset of best features in single wavelength and multiple wavelength settings using random forests, classification was performed using standard SVM implementation with a linear kernel. The performance of the classifiers was determined by 5×2 crossvalidation. The entire crossvalidation procedure was repeated 10 times with different seeds for a random number generator. The final results are reported in Tables 3-6. Tables 3-6 show confusion matrices (as percentages) with accompanying standard deviations, for 405 nm (A), 635 nm (B), 904 nm (C), and a mix of features from all three wavelengths (D), respectively.

TABLE 3

| (A) | E. coli | | Listeria | | Salmonella | | Staph. | |
|---|---|---|---|---|---|---|---|---|
| E. coli | 93.75 | (0.38) | 0.43 | (0.49) | 1.25 | (0.14) | 2.5 | (0.17) |
| Listeria | 3.64 | (0.256) | 99.16 | (0.58) | 0.23 | (0.22) | 0.13 | (0.168) |
| Salmonella | 2.57 | (0.302) | 0.43 | (0.27) | 96.12 | (0.3) | 0.66 | (0) |
| Staph. | 0.00 | (0) | 0 | (0) | 2.39 | (0.46) | 96.73 | (0) |

TABLE 4

| (B) | E. coli | | Listeria | | Salmonella | | Staph. | |
|---|---|---|---|---|---|---|---|---|
| E. coli | 98.85 | (0.233) | 0 | (0) | 0.66 | (0) | 0 | (0) |
| Listeria | 1.14 | (0.23) | 99.35 | (0) | 0.65 | (0) | 0 | (0) |
| Salmonella | 0.00 | (0) | 0.66 | (0) | 98.59 | (0.22) | 0 | (0) |
| Staph. | 0.00 | (0) | 0 | (0) | 0.1 | (0.22) | 100 | (0) |

TABLE 5

| (C) | E. coli | | Listeria | | Salmonella | | Staph. | |
|---|---|---|---|---|---|---|---|---|
| E. coli | 98.32 | (0.423) | 1.12 | (0.32) | 0.13 | (0.23) | 0.33 | (0.219) |
| Listeria | 1.27 | (0.284) | 98.9 | (0.31) | 1.82 | (0.38) | 0 | (0) |
| Salmonella | 0.39 | (0.34) | 0 | (0) | 95.76 | (0.68) | 0.07 | (0.139) |
| Staph. | 0.00 | (0) | 0 | (0) | 2.25 | (0.36) | 99.61 | (0.207) |

TABLE 6

| (D) | E. coli | | Listeria | | Salmonella | | Staph. | |
|---|---|---|---|---|---|---|---|---|
| E. coli | 99.93 | (0.139) | 0 | (0) | 0.1 | (0.16) | 0.59 | (0.139) |
| Listeria | 0.00 | (0) | 100 | (0) | 1.33 | (0.42) | 0 | (0) |
| Salmonella | 0.07 | (0.139) | 0 | (0) | 98.45 | (0.47) | 0 | (0) |
| Staph. | 0.00 | (0) | 0 | (0) | 0.1 | (0.16) | 99.41 | (0.138) |

FIGS. 22A-22D are three-dimensional linear-discriminant analysis plots showing feature-space distances between colonies of different types of micro-organisms. The linear discriminant analysis plots show the structure of the data point clouds in 3-D, and illustrate differences between classifiers determined from different features sets (FIGS. 22A-22D).

A variety of embodiments of MS-BARDOT instrument provide a stepping motor and right angle gold mirror to physically move the three lasers sequentially over a distance, which can be e.g. 10 mm, over a period of seconds, during which the patterns at the different wavelengths can be recorded. One benefit of this set of embodiments is it maintains the optics-free design of single wavelength BARDOT, which reduces stray scattered light that might affect the acquired scatter patterns.

A variety of embodiments of MS-BARDOT instrument provide a laser source module which incorporates multiple, e.g., three, incident laser wavelengths, a photodiode, and one or more, e.g., two, pellicle beam splitters. Some of these embodiments provide multiple wavelength laser sources in a compact system or permit acquisition of multiple wavelength images in a rapid manner (e.g., ~3.5 sec per colony). Various examples include an additional photodiode configured to acquire absorption data during irradiation, permitting monitoring the input intensity. In a variety of aspects, a pellicle beam splitter can reduce or remove multiple-reflection images from prior two-beam splitters.

Due the spectral nature of the new modeling approach, all the derived formulas include the wavelength term. In addition, the spectral dependency of the refractive index plays an important role in calculating the two major characteristics of the scatter patterns ( ). As discussed above with reference to FIG. 10, both the number of rings and the half diffraction angle show an inversely proportional relationship to the incident wavelength and correlated with spectrally-varying refractive index. In some examples, due to the biological growth nature of the bacterial colony, the colony forms a dense core area and a rim area where cells are constantly dividing and expanding the boundary. The diffraction patterns can be correlated with the biological structure in the rim area, e.g., exhibiting a lower outermost-ring intensity than the computed simulation for a Gaussian shape.

Multispectral forward scattering can provide valuable information regarding the bacterial colony. A benefit of a variety of aspects is that optical absorption data (e.g., optical density, or OD) can be incorporated into a Zernike or other spatial scatter pattern analysis. This can permit interrogating different kinds of bacterial colonies, since some pathogenic and non-pathogenic bacteria have different extracellular material such as capsular-polysaccharides. Combining spatial scattering patterns and optical absorption can provide improved resolution and classification in different phylogenic bacteria. A further benefit is that understanding of the multispectral system allows expansion of it to a hyperspectral forward scatterometer which can be designed with acousto-optic tunable filters (AOTF) and super-continuum lasers.

In a variety of aspects, cage-mounted pellicle beam splitters can reduce ghosting. The cage system itself provides proper alignment of the incident light. Other optical mounting systems can also be used. Various aspects include three lasers, a translation stage, and a CMOS camera control which includes one IEEE1394 port, seven digital input/outputs (I/O), and two analog-to-digital converters (ADC). Calibration at each wavelength can be performed to accommodate different reflectance/transmission ratios from the pellicle beam splitter and spectral quantum efficiencies from the CMOS camera. The incoming spectral intensity can be measured and compensated for each wavelength such that approximately the same intensity is perceived by the CMOS camera (FIG. 2).

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein.

Figure 23:
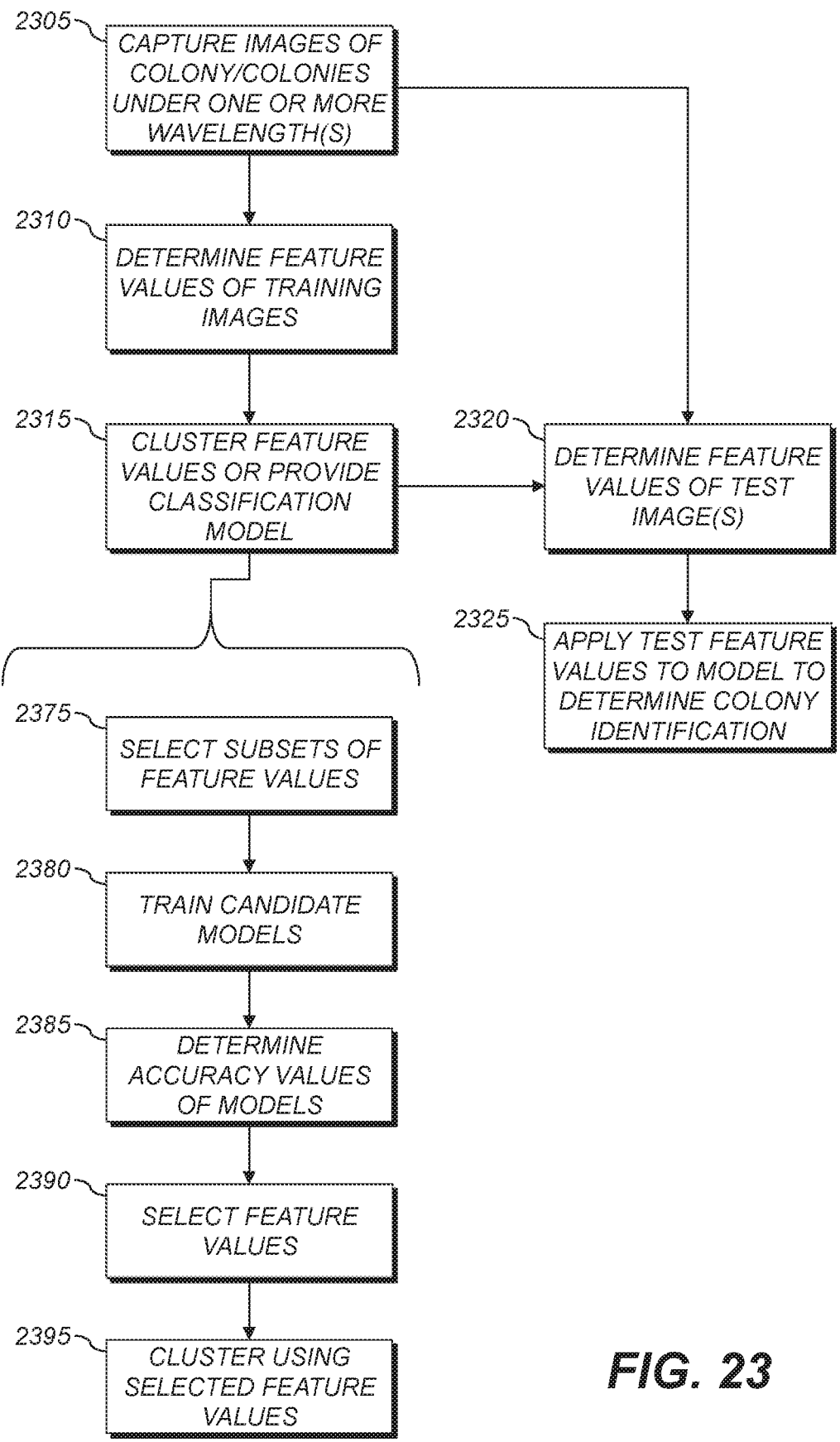
FIG. 23 is a flowchart showing example methods for identifying micro-organisms.

FIG. 23 shows a flowchart illustrating an exemplary method for, e.g., training or employing a computational model to identify types of micro-organisms in colonies. Also shown are data produced by some of the blocks. The blocks can be performed in any order except when otherwise specified, or when data from an earlier block is used in a later block. In at least one example, processing begins with block 2305, block 2310, or block 2320. For clarity of explanation, reference is herein made to various components shown in FIG. 1A, 1B, 2, 3A-3E, 4A, 4B, 5A, 14A, or 14B that can carry out or participate in the steps of the exemplary method. It should be noted, however, that other components can be used; that is, exemplary method(s) shown in FIG. 2 are not limited to being carried out by the identified components.

In some examples, at block 2305, images are captured of colonies of micro-organisms, e.g., under irradiation of one or more wavelength(s). For example, the images can be captured using an imager during irradiation of corresponding ones of the colonies with corresponding ones of the wavelengths. In some examples, the images can be captured using a multispectral transmissive system such as that described above with reference to FIG. 1A, 1B, 2, 14A, or 14B; a multispectral reflective or transmissive/reflective system such as that described above with reference to FIGS. 3A-3E, 4A, 4B, or 5A; or a reflective system such as that described above with respect to transmissive/reflective systems, omitting or not using the transmissive portion.

At block 2310, feature values are determined based at least in part on images, e.g., training images, of colonies of micro-organisms under irradiation of different wavelengths. The images can be, e.g., forward or reverse scatter images such as discussed above with reference to, e.g., FIGS. 5B-5I. The feature values can be determined, e.g., using Zernike polynomials such as discussed above with reference to FIG. 21. For example, at least some of the feature values can include one or more Zernike or pseudo-Zernike moments for individual ones of the images.

In some examples, at block 2310, a first feature value of the at least some of the determined feature values is determined based at least in part on a first one of the images corresponding to irradiation of a first one of the wavelengths. A second feature value of the at least some of the determined feature values is determined based at least in part on a second one of the images corresponding to irradiation of a second, different one of the wavelengths. For example, the images can include a 405 nm image of a colony and a 635 nm image of the same colony. One of the feature values can be, e.g., the $Z_2^0$ Zernike moment of the 405 nm image, and another one of the feature values can be, e.g., the $Z_2^0$ Zernike moment of the 635 nm image.

At block 2315, at least some of the determined feature values are clustered based at least in part on colony-identification values of the images. The colony-identification values can be, e.g., values representing the genus, species, sub-species (e.g., serovar), or other type of micro-organism. Each image can be associated with such a value. For example, the three images in the left-hand column of FIG. 19 can share a colony-identification value corresponding to *E. coli* O157:H7. The clustering can be done using, e.g., support vector machines (SVMs), hierarchical or centroid-based clustering algorithms, distribution- or density-based clusters, or other clustering algorithms. In some examples, the clustering comprises training a classification model, e.g., an SVM, using the at least some of the determined feature values as training data and the colony-identification values as class data. Clusters of feature values in feature space can be associated with colony-identification values.

At block 2320, e.g., after block 2315, test feature values can be determined based at least in part on images of a test micro-organism colony under irradiation of different wavelengths. The images can be scatter images. The feature values can be determined, e.g., as discussed above with reference to block 2310.

At block 2325, a test colony-identification value of the test micro-organism colony can be determined by applying the test feature values to the trained classification model. For example, the test colony-identification value can be selected as the colony-identification value associated with the cluster of the trained classification model to which the test feature values belong.

In some examples, block 2315 includes blocks 2375, 2380, 2385, 2390, or 2395.

At block 2375, multiple subsets of the determined feature values are selected. For example, the subsets can be selected randomly. In some examples, a random forest algorithm is used, as discussed above with reference to FIG. 21.

At block 2380, candidate classification models can be trained for respective ones of the subsets. For example, clustering can be performed separately based on each subset. The training can be done, e.g., as described above with reference to block 2315.

At block 2385, accuracy values are determined for respective ones of the trained candidate classification models. For example, feature values of evaluation images not included in the training can be applied to the models.

At block 2390, at least some of the determined feature values are selected based at least in part on the determined accuracy values. This permits determining, for a specific training set of images, which combination of features permits most effectively distinguishing micro-organism types from each other or identifying micro-organism types.

At block 2395, the clustering can be performed using the determined feature values. For example, an SVM can be trained using the determined feature values, as discussed above with reference to FIG. 21.

In view of the foregoing, various aspects provide measurement of bacterial colonies and analysis of measured data. A technical effect of some examples is to determine the type of bacteria growing in a measured bacterial colony. A further technical effect of some examples is to control operation of, e.g., an X-Y stage or a laser source to successively irradiate one or more colonies with light of one or more wavelengths.

Figure 24:
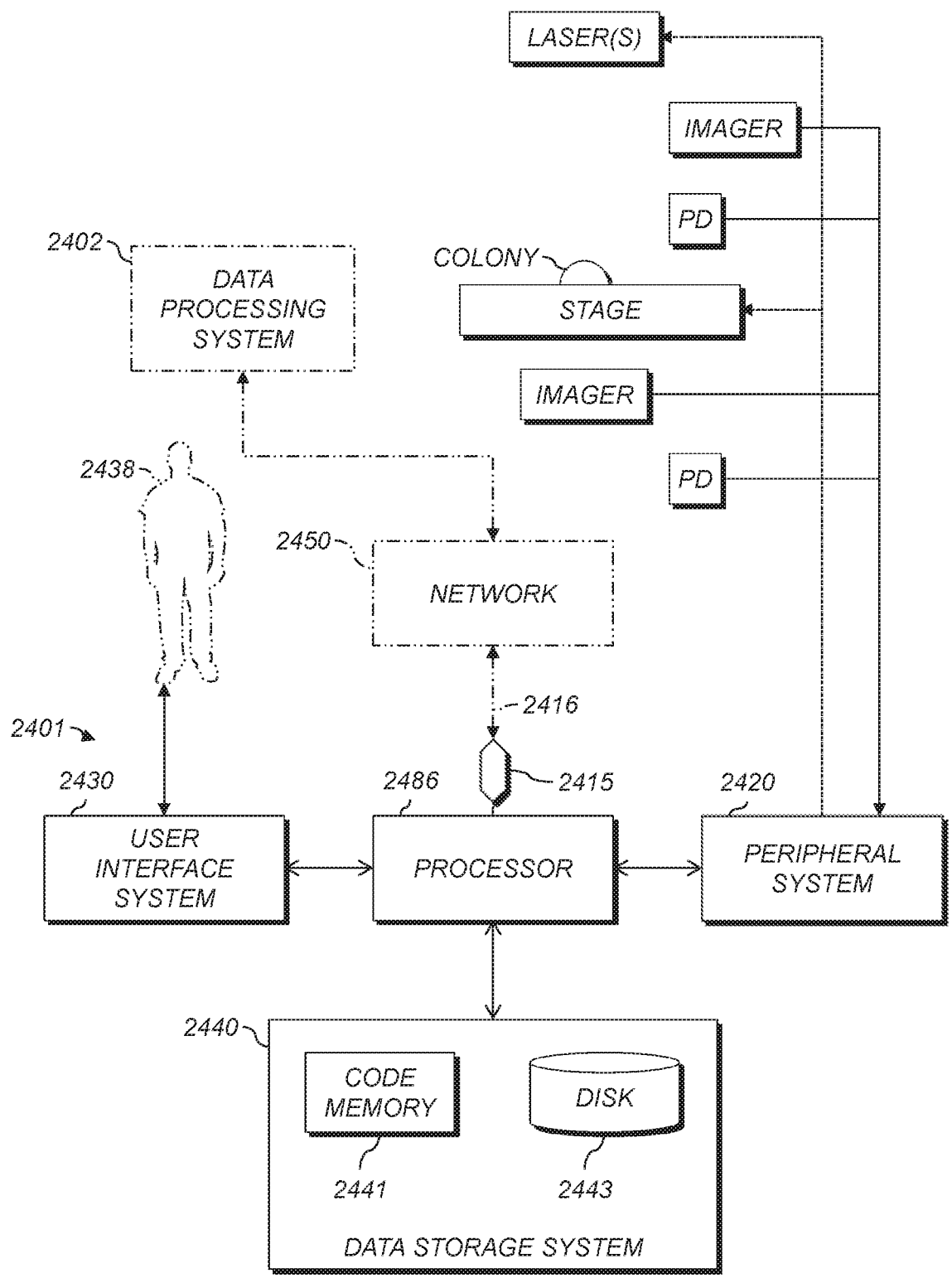
FIG. 24 is a high-level diagram showing components of a data-processing system.

FIG. 24 is a high-level diagram showing the components of an exemplary data-processing system 2401 for analyzing data and performing other analyses described herein, and related components. The system 2401 includes a processor 2486, a peripheral system 2420, a user interface system 2430, and a data storage system 2440. The peripheral system 2420, the user interface system 2430 and the data storage system 2440 are communicatively connected to the processor 2486. Processor 2486 can be communicatively connected to network 2450 (shown in phantom), e.g., the Internet or a leased line, as discussed below. Sequence controller 104 or other labeled components shown in FIG. 1B, X-Y translation stage 218 (FIG. 2), or labeled components of FIG. 3A or 5A, can each include one or more of systems 2486, 2420, 2430, 2440, and can each connect to one or more network(s) 2450. Processor 2486, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 2486 can implement processes of various aspects described herein, e.g., with reference to FIG. 23. Processor 2486 and related components can, e.g., carry out processes for operating imaging systems to capture images of colonies or processes for analyzing image data to train computational models or identify bacteria.

Processor 2486 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 2420, user interface system 2430, and data storage system 2440 are shown separately from the data processing system 2486 but can be stored completely or partially within the data processing system 2486.

The peripheral system 2420 can include or be communicatively connected with one or more devices configured or otherwise adapted to provide digital content records to the processor 2486 or to take action in response to processor 186. For example, the peripheral system 2420 can include digital still cameras, digital video cameras, cellular phones, or other data processors. The processor 2486, upon receipt of digital content records from a device in the peripheral system 2420, can store such digital content records in the data storage system 2440. In the illustrated example, peripheral system 2420 is communicatively connected to control laser(s) or a stage (e.g., a stage holding an agar plate with a colony growing thereon), and to receive information from imager(s) or photodiode(s) collecting light above or below (on a forward or reverse side of) the colony.

The user interface system 2430 can convey information in either direction, or in both directions, between a user 2438 and the processor 2486 or other components of system 2401. The user interface system 2430 can include a mouse, a keyboard, another computer (connected, e.g., via a network or a null-modem cable), or any device or combination of devices from which data is input to the processor 2486. The user interface system 2430 also can include a display device, a processor-accessible memory, or any device or combination of devices to which data is output by the processor 2486. The user interface system 2430 and the data storage system 2440 can share a processor-accessible memory.

In various aspects, processor 2486 includes or is connected to communication interface 2415 that is coupled via network link 2416 (shown in phantom) to network 2450. For example, communication interface 2415 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 2415 sends and receives electrical, electromagnetic or optical signals that carry digital or analog data streams representing various types of information across network link 2416 to network 2450. Network link 2416 can be connected to network 2450 via a switch, gateway, hub, router, or other networking device.

In various aspects, system 2401 can communicate, e.g., via network 2450, with a data processing system 2402, which can include the same types of components as system 2401 but is not required to be identical thereto. Systems 2401, 2402 are communicatively connected via the network 2450. Each system 2401, 2402 executes computer program instructions to, e.g., operate measurement instruments or analyze data. In an example, system 2401 operates Processor 2486 can send messages and receive data, including program code, through network 2450, network link 2416 and communication interface 2415. For example, a server can store requested code for an application program (e.g., a JAVA applet) on a tangible non-volatile computer-readable storage medium to which it is connected. The server can retrieve the code from the medium and transmit it through network 2450 to communication interface 2415. The received code can be executed by processor 2486 as it is received, or stored in data storage system 2440 for later execution.

Data storage system 2440 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 2486 can transfer data (using appropriate components of peripheral system 2420), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 2440 can be a tangible non-transitory computer-readable storage medium, i.e., a non-transitory device or article of manufacture that participates in storing instructions that can be provided to processor 2486 for execution.

In an example, data storage system 2440 includes code memory 2441, e.g., a RAM, and disk 2443, e.g., a tangible computer-readable rotational storage device or medium such as a hard drive. Computer program instructions are read into code memory 2441 from disk 2443. Processor 2486 then executes one or more sequences of the computer program instructions loaded into code memory 2441, as a result performing process steps described herein. In this way, processor 2486 carries out a computer implemented process. For example, steps of methods described herein, blocks of the flowchart illustrations or block diagrams herein, and combinations of those, can be implemented by computer program instructions. Code memory 2441 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 2486 (and possibly also other processors), and that, when loaded into processor 2486, cause functions, acts, or operational steps of various aspects herein to be performed by processor 2486 (or other processor). Computer program code for carrying out operations for various aspects described herein may be written in any combination of one or more programming language(s), and can be loaded from disk 2443 into code memory 2441 for execution. The program code may execute, e.g., entirely on processor 2486, partly on processor 2486 and partly on a remote computer connected to network 2450, or entirely on the remote computer.

EXAMPLE CLAUSES

Throughout these example clauses, parenthetical remarks are examples and are not limiting. Examples given in the parenthetical remarks of specific example clauses can also apply to the same terms appearing elsewhere in these example clauses.

A: A system for the identification of micro-organisms, the system comprising: an irradiation unit (e.g., including sources 108A, 108B, and 108C, and beamsplitters 106A, 106B, all FIG. 1A) adapted to sequentially provide coherent electromagnetic radiation of multiple wavelengths along a common optical path (horizontal axis in FIGS. 14A, 14B); a holder (fork structure shown in FIG. 2 under petri dish 110 and shown in FIG. 3A under the bacteria agar plate) adapted to retain a substrate having a surface adapted for growth of a micro-organism colony (petri dish 110, FIGS. 1A, 2); a beamsplitter (304) adapted to direct the coherent electromagnetic radiation from the common optical path towards the retained substrate; and an imager (backward scattering pattern grabber 306, FIGS. 3A and 3E) arranged opposite the beam splitter from the retained substrate and adapted to obtain images of backward-scattered light patterns from the micro-organism colony ("bacterial colony," FIG. 1A) irradiated by the respective wavelengths of the directed coherent electromagnetic radiation.

B: The system according to paragraph A, further comprising: a stage ("2-axis lateral stage," FIG. 1B) adapted to translate the retained substrate or the beamsplitter with respect to each other so that the directed coherent electromagnetic radiation irradiates the micro-organism colony. (For example, the substrate can move and the beamsplitter remain stationary, the beamsplitter can move and the substrate remain stationary, or both the substrate and the beamsplitter can move.)

C: The system according to paragraph B, further comprising a controller (104) configured to: operate the stage and the irradiation unit to irradiate a first colony of a plurality of micro-organism colonies on the retained substrate; operate the imager to obtain a first image (e.g., FIG. 5B) and a second image (e.g., FIG. 5D) of backward-scattered light patterns from the first colony, the first image corresponding to a first wavelength and the second image corresponding to a second, different wavelength; subsequently (e.g., subsequent to the obtaining of the first image and the second image), operate the stage and the irradiation unit to irradiate a second colony of the plurality of micro-organism colonies on the retained substrate; and operate the imager to obtain a third image (e.g., FIG. 5E) and a fourth image (e.g., FIG. 5F) of backward-scattered light patterns from the second colony, the third image corresponding to a third wavelength and the fourth image corresponding to a fourth wavelength different from the third wavelength.

D: The system according to any of paragraphs A-C, wherein the irradiation unit comprises: multiple sources (108A, 108B, 108C) for the respective wavelengths of the coherent electromagnetic radiation; and one or more source beamsplitters (106A, 106B) configured to direct the coherent electromagnetic radiation from the sources to the common optical path.

E: The system according to paragraph D, wherein the sources comprise respective lasers (e.g., laser diodes as described above, or gas, dye, or solid lasers).

F: The system according to paragraph D or E, wherein the source beamsplitters comprise respective pellicle beamsplitters.

G: The system according to any of paragraphs D-F, wherein the source beamsplitters comprise R45:T55 beamsplitters or beamsplitters of other R:T ratios.

H: The system according to any of paragraphs D-G, wherein the source beamsplitters comprise cage mounts or other optical mounts.

I: The system according to any of paragraphs D-H, wherein the one or more source beamsplitters consist of a number of beamsplitters equal to the number of sources minus one.

J: The system according to any of paragraphs A-I, wherein the wavelengths comprise one or more of 405 nm, 635 nm, or 904 nm.

K: The system according to any of paragraphs A-J, wherein the irradiation unit further comprises a sensor configured to detect a level value (e.g., intensity, power, radiance, irradiance, or any other radiometric or photometric quantity indicative of coherent electromagnetic radiation level detected by the sensor) of the coherent electromagnetic radiation.

L: The system according to paragraph K, wherein: the level value corresponds to a selected one of the wavelengths; and the system further comprises a controller (124) responsive to the level value and a selected set point (based, e.g., on sensor response) to adjust an output level (e.g., drive power, voltage, or current, actual watts or lumens out, or other quantities indicative or determinative of coherent electromagnetic radiation level emitted by the source(s)) of the coherent electromagnetic radiation of the selected one of the wavelengths.

M: The system according to paragraph K or L, wherein the controller is further configured to: determine respective level values of the multiple wavelengths using the sensor; and adjust respective output levels of the coherent electromagnetic radiation of the respective ones of the wavelengths based at least in part on the respective level values and a selected set point.

N: The system according to any of paragraphs K-M, wherein the sensor is arranged substantially upstream of the beamsplitter (e.g., closer to the source(s) than the beamsplitter) along the common optical path (e.g., as part of laser source 302, FIG. 3A).

O: The system according to any of paragraphs K-N, wherein the sensor is arranged optically between the beamsplitter and the retained substrate (e.g., between 304 and the agar plate, FIG. 3A; this can be done using a beamsplitter such as the lower beamsplitter 106, FIG. 2).

P: The system according to any of paragraphs K-O, wherein: the sensor is arranged optically upstream of the retained substrate (e.g., PD #1 114, FIG. 2); and the system further comprises a second sensor (e.g., PD #2 216, FIG. 2) arranged optically downstream of the retained substrate and configured to detect a second level value of the coherent electromagnetic radiation.

Q: The system according to paragraph P, further comprising a computation unit (124 or 104, FIG. 1B) configured to determine an optical density of the micro-organism colony irradiated by the directed coherent electromagnetic radiation based at least in part on the level value and the second level value.

R: The system according to any of paragraphs A-Q, further comprising: a second imager (forward scattering pattern grabber, FIG. 3E) arranged opposite the retained substrate from the beamsplitter and adapted to obtain images of forward-scattered light patterns from the micro-organism colony irradiated by the respective wavelengths of the directed coherent electromagnetic radiation.

S: The system according to paragraph R, further comprising: a first sensor (114) arranged optically upstream of the retained substrate and configured to detect a first level value of the coherent electromagnetic radiation; and a second sensor (216) arranged optically downstream of the retained substrate and configured to detect a second level value of the coherent electromagnetic radiation.

T: The system according to paragraph S, further comprising a second beamsplitter (214) arranged between the retained substrate and the second imager and configured to direct at least some electromagnetic radiation passing through the retained substrate to the second sensor.

U: The system according to any of paragraphs A-T, wherein the second beamsplitter comprises a pellicle beamsplitter.

V: The system according to any of paragraphs A-U, wherein the second beamsplitter comprises a plate beamsplitter coated with a wideband antireflective coating.

W: The system according to any of paragraphs A-V, wherein the second beamsplitter comprises an R45:T55 beamsplitter.

X: The system according to any of paragraphs A-W, wherein the second beamsplitter comprises a cage mount.

Y: The system according to any of paragraphs A-X, wherein the beamsplitter comprises a pellicle beamsplitter.

Z: The system according to any of paragraphs A-Y, wherein the beamsplitter comprises a plate beamsplitter coated with a wideband antireflective coating.

AA: The system according to any of paragraphs A-Z, wherein the beamsplitter comprises an R45:T55 beamsplitter.

AB: The system according to any of paragraphs A-AA, wherein the beamsplitter comprises a cage mount.

AC: The system according to any of paragraphs A-AB, wherein the optical path between the retained substrate and the imager consists of one or more non-focusing optical elements (e.g., beamsplitters such as pellicle beamsplitters or polarizing beamsplitters, mirrors, prism-based reflectors, or other elements not having a focal distance or otherwise configured to direct light without focusing the light).

AD: A system for the identification of micro-organisms, the system comprising: an irradiation unit adapted to provide coherent electromagnetic radiation of a selected wavelength along an optical path; a holder adapted to retain a substrate having a surface adapted for growth of a micro-organism colony; a beamsplitter adapted to direct the coherent electromagnetic radiation from the optical path towards the retained substrate; and an imager arranged opposite the beamsplitter from the retained substrate and adapted to obtain an image of a backward-scattered light pattern from the micro-organism colony irradiated by the directed coherent electromagnetic radiation.

AE: The system according to paragraph AD, further comprising: a stage adapted to translate the retained substrate or the beamsplitter with respect to each other so that the directed coherent electromagnetic radiation irradiates the micro-organism colony.

AF: The system according to paragraph AE, further comprising a controller configured to: operate the stage and the irradiation unit to successively irradiate ones of a plurality of micro-organism colonies on the retained substrate; and operate the imager to obtain a plurality of images of backward-scattered light patterns from the successively-irradiated micro-organism colonies, the plurality of images including at least first and second images of a first colony at respective, different wavelengths, and third and fourth images of a second, different colony at respective, different wavelengths.

AG: The system according to any of paragraphs AD-AF, wherein the irradiation unit further comprises a sensor configured to detect a level value of the coherent electromagnetic radiation.

AH: The system according to paragraph AG, further comprising a controller responsive to the level value and a selected set point to adjust an output level of the coherent electromagnetic radiation.

AI: The system according to any of paragraphs AD-AH, wherein the beamsplitter comprises a pellicle beamsplitter.

AJ: The system according to any of paragraphs AD-AI, wherein the beamsplitter comprises a plate beamsplitter coated with a wideband antireflective coating.

AK: The system according to any of paragraphs AD-AJ, wherein the beamsplitter comprises an R45:T55 beamsplitter.

AL: The system according to any of paragraphs AD-AK, wherein the beamsplitter comprises a cage mount.

AM: The system according to any of paragraphs AD-AL, wherein the optical path between the retained substrate and the imager consists of one or more non-focusing optical elements.

AN: A system for the identification of micro-organisms, the system comprising: an irradiation unit adapted to sequentially provide coherent electromagnetic radiation of multiple wavelengths along a common optical path; a holder adapted to retain a substrate having a surface adapted for growth of a micro-organism colony in operative arrangement to receive the coherent electromagnetic radiation along the common optical path; and an imager arranged optically downstream of the retained substrate and adapted to obtain images of forward-scattered light patterns from the micro-organism colony irradiated by the respective wavelengths of the directed coherent electromagnetic radiation.

AO: The system according to paragraph AN, further comprising: a stage adapted to translate the retained substrate or irradiation unit with respect to each other so that the directed coherent electromagnetic radiation irradiates the micro-organism colony.

AP: The system according to paragraph AO, further comprising a controller configured to: operate the stage and the irradiation unit to successively irradiate ones of a plurality of micro-organism colonies on the retained substrate; and operate the imager to obtain a plurality of images of backward-scattered light patterns from the successively-irradiated micro-organism colonies, the plurality of images including at least first and second images of a first colony at respective, different wavelengths, and third and fourth images of a second, different colony at respective, different wavelengths.

AQ: The system according to any of paragraphs AN-AP, wherein the irradiation unit comprises: multiple sources for the respective wavelengths of the coherent electromagnetic radiation; and one or more source beamsplitters configured to direct the coherent electromagnetic radiation from the sources to the common optical path.

AR: The system according to paragraph AQ, wherein the sources comprise respective lasers.

AS: The system according to paragraph AQ or AR, wherein the source beamsplitters comprise respective pellicle beamsplitters.

AT: The system according to any of paragraphs AQ-AS, wherein the source beamsplitters comprise R45:T55 beamsplitters.

AU: The system according to any of paragraphs AQ-AT, wherein the source beamsplitters comprise cage mounts.

AV: The system according to any of paragraphs AQ-AU, wherein the one or more source beamsplitters consist of a number of beamsplitters equal to the number of sources minus one.

AW: The system according to any of paragraphs AN-AV, wherein the wavelengths comprise one or more of 405 nm, 635 nm, or 904 nm.

AX: The system according to any of paragraphs AN-AW, wherein the irradiation unit further comprises a sensor configured to detect a level value of the coherent electromagnetic radiation.

AY: The system according to paragraph AX, wherein: the level value corresponds to a selected one of the wavelengths; and the system further comprises a controller responsive to the level value and a selected set point to adjust an output level of the coherent electromagnetic radiation of the selected one of the wavelengths.

AZ: The system according to paragraph AX or AY, wherein the controller is further configured to: determine respective level values of the multiple wavelengths using the sensor; and adjust respective output levels of the coherent electromagnetic radiation of the respective ones of the wavelengths based at least in part on the respective level values and a selected set point.

BA: The system according to any of paragraphs AX-AZ, wherein the sensor is arranged substantially upstream of the retained substrate along the common optical path.

BB: The system according to paragraph BA, further comprising a second sensor arranged optically downstream of the retained substrate and configured to detect a second level value of the coherent electromagnetic radiation.

BC: The system according to paragraph BB, further comprising a computation unit configured to determine an optical density of the micro-organism colony irradiated by the directed coherent electromagnetic radiation based at least in part on the level value and the second level value.

BD: The system according to paragraph BB or BC, further comprising a beamsplitter arranged between the retained substrate and the second imager and configured to direct at least some electromagnetic radiation passing through the retained substrate to the second sensor.

BE: The system according to paragraph BD, wherein the beamsplitter comprises a pellicle beamsplitter.

BF: The system according to paragraph BD or BE, wherein the beamsplitter comprises a plate beamsplitter coated with a wideband antireflective coating.

BG: The system according to any of paragraphs BD-BF, wherein the beamsplitter comprises an R45:T55 beamsplitter.

BH: The system according to any of paragraphs BD-BG, wherein the beamsplitter comprises a cage mount.

BI: A method comprising: determining feature values based at least in part on images of colonies of micro-organisms under irradiation (e.g., visible-light or otherwise, e.g., 300 nm-800 nm, or ultraviolet to near-infrared) of different wavelengths (e.g., one wavelength per image); and clustering at least some of the determined feature values based at least in part on colony-identification values of the images.

BJ: The method according to paragraph BI, wherein the clustering comprises training a classification model using the at least some of the determined feature values as training data and the colony-identification values as class data.

BK: The method according to paragraph BJ, wherein the classification model includes a support vector machine.

BL: The method according to paragraph BJ or BK, further comprising: determining test feature values based at least in part on images of a test micro-organism colony (e.g., images not included in the images used for the clustering) under irradiation of different wavelengths;

and determining a test colony-identification value of the test micro-organism colony by applying the test feature values to the trained classification model.

BM: The method according to any of paragraphs BI-BL, wherein the clustering comprises: selecting multiple subsets of the determined feature values; training candidate classification models for respective ones of the subsets; determining accuracy values for respective ones of the trained candidate classification models; and selecting the at least some of the determined feature values based at least in part on the determined accuracy values (e.g., random forest selection as described above).

BN: The method according to any of paragraphs BI-BM, wherein the determining comprises determining, as at least some of the feature values, one or more Zernike or pseudo-Zernike moments for individual ones of the images.

BO: The method according to any of paragraphs BI-BN, further comprising: determining a first feature value of the at least some of the determined feature values based at least in part on a first one of the images corresponding to irradiation of a first one of the wavelengths; and determining a second feature value of the at least some of the determined feature values based at least in part on a second one of the images corresponding to irradiation of a second, different one of the wavelengths (e.g., using plural features determined from images captured at respective, different wavelengths).

BP: The method according to any of paragraphs BI-BO, further comprising: capturing the images using an imager during irradiation of corresponding ones of the colonies with corresponding ones of the wavelengths.

BQ: The method according to any of paragraphs BI-BP, further comprising: capturing the images using a system as recited in any of paragraphs A-AC (e.g., a multispectral reflective or reflective/transmissive imaging system).

BR: The method according to any of paragraphs BI-BP, further comprising: capturing the images using a system as recited in any of paragraphs AD-AM (e.g., a single-wavelength reflective imaging system).

BS: The method according to any of paragraphs BI-BP, further comprising: capturing the images using a system as recited in any of paragraphs AN-BH (e.g., a multi spectral transmissive imaging system).

BT: A computer-readable medium, e.g., a computer storage medium, having thereon computer-executable instructions, the computer-executable instructions upon execution configuring a computer to perform operations as any of any of paragraphs BH-BS recite.

BU: A device comprising: a processor; and a computer-readable medium, e.g., a computer storage medium, having thereon computer-executable instructions, the computer-executable instructions upon execution by the processor configuring the device to perform operations as any of paragraphs BH-BS recite.

BV: A device comprising: a processor; and a computer-readable medium, e.g., a computer storage medium, having thereon computer-executable instructions, the computer-executable instructions executable by the processor to cause the processor to perform operations as any of any of paragraphs BH-BS recite.

BW: A system comprising: means for processing; and means for storing having thereon computer-executable instructions, the computer-executable instructions including means to configure the system to carry out a method as any of any of paragraphs BH-BS recite.

CONCLUSION

The invention is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used herein in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A system for the identification of micro-organisms, the system comprising:
    an irradiation unit that sequentially provides coherent electromagnetic radiation of multiple wavelengths along a common optical path;
    a holder adapted to retain a substrate having a solid surface adapted for holding a micro-organism colony, the microorganism colony comprising a plurality of microorganisms;
    a beamsplitter that directs the coherent electromagnetic radiation from the common optical path towards the retained substrate;
    a first imager arranged directly opposite the beamsplitter from the retained substrate and adapted to obtain images of elastically backward-scattered light patterns from the micro-organism colony irradiated by the respective wavelengths of the directed coherent electromagnetic radiation, the elastically backward-scattered light patterns formed substantially from a first portion of the directed coherent electromagnetic radiation scattered back from the micro-organism colony;
    a second imager arranged directly opposite the retained substrate from the beamsplitter and adapted to obtain an image of forward-scattered light patterns from the micro-organism colony irradiated by the respective wavelengths of the directed coherent electromagnetic radiation, the forward-scattered light patterns formed substantially from a second portion of the directed coherent electromagnetic radiation; and
    an optical density measurement unit that determines an optical density of the microorganism colony irradiated by the coherent electromagnetic radiation.

2. The system according to claim 1, further comprising a stage that translates the retained substrate or the beamsplitter with respect to each other so that the directed coherent electromagnetic radiation irradiates the micro-organism colony.

3. The system according to claim 2, further comprising a controller configured to:
    operate the stage and the irradiation unit to irradiate a first colony of a plurality of micro-organism colonies on the retained substrate;
    operate the first imager to obtain a first image and a second image of elastically backward-scattered light patterns from the first colony, the first image corresponding to a first wavelength and the second image corresponding to a second, different wavelength;
    subsequently, operate the stage and the irradiation unit to irradiate a second colony of the plurality of micro-organism colonies on the retained substrate; and
    operate the first imager to obtain a third image and a fourth image of elastically backward-scattered light patterns from the second colony, the third image corresponding to a third wavelength and the fourth image corresponding to a fourth wavelength different from the third wavelength.

4. The system according to claim 3, wherein the controller is configured to utilize at least one the first portion, the second portion, and the optical density to measure a cross-sectional morphology of the micro-organism colony.

5. The system according to claim 3, wherein the controller utilizes the optical density measurement unit to determine an aspect ratio of the microorganism colony.

6. The system according to claim 3, wherein the controller utilizes the optical density measurement unit to determine an elevation height of a center of the microorganism colony.

7. The system according to claim 1, wherein the irradiation unit comprises:
    multiple sources for the respective wavelengths of the coherent electromagnetic radiation; and
    one or more source beamsplitters configured to direct the coherent electromagnetic radiation from the sources to the common optical path.

8. The system according to claim 7, wherein the source beamsplitters comprise respective pellicle beamsplitters.

9. The system according to claim 1, wherein the irradiation unit further comprises a sensor configured to detect a level value of the coherent electromagnetic radiation.

10. The system according to claim 9, wherein the controller is further configured to:
    determine respective level values of the multiple wavelengths using the sensor; and
    adjust respective output levels of the coherent electromagnetic radiation of the respective ones of the wavelengths based at least in part on the respective level values and a selected set point.

11. The system according to claim 10, further comprising:
    a first sensor arranged optically upstream of the retained substrate and configured to detect a first level value of the coherent electromagnetic radiation; and a second sensor arranged optically downstream of the retained substrate and configured to detect a second level value of the coherent electromagnetic radiation.

12. The system according to claim 1, wherein the second portion formed from the forward-scattered light patterns and the optical density of the microorganism colony irradiated by the coherent electromagnetic radiation are measured simultaneously.

13. A system for the identification of micro-organisms, the system comprising:
an irradiation unit that provides coherent electromagnetic radiation of a selected wavelength along an optical path;
a holder adapted to retain a substrate having a surface adapted for growth of a micro-organism colony, the microorganism colony comprising a plurality of microorganisms;
a beamsplitter that directs the coherent electromagnetic radiation from the optical path towards the retained substrate;
a first imager arranged directly opposite the beamsplitter from the retained substrate and adapted to obtain an image of an elastically backward-scattered light pattern from the micro-organism colony irradiated by the directed coherent electromagnetic radiation, the backward scattered light patterns formed substantially from a first portion of the directed coherent electromagnetic radiation scattered back from the micro-organism colony;
a second imager arranged directly opposite the retained substrate from the beamsplitter and adapted to obtain an image of forward-scattered light patterns from the micro-organism colony irradiated by the directed coherent electromagnetic radiation, the forward-scattered light patterns formed substantially from a second portion of the directed coherent electromagnetic radiation; and
an optical density measurement unit that determines an optical density of the microorganism colony irradiated by the coherent electromagnetic radiation.

14. The system according to claim 13, further comprising:
a stage adapted to translate the retained substrate or the beamsplitter with respect to each other so that the directed coherent electromagnetic radiation irradiates the micro-organism colony; and
a controller configured to:
operate the stage and the irradiation unit to successively irradiate ones of a plurality of micro-organism colonies on the retained substrate; and
operate the first imager to obtain a plurality of images of elastically backward-scattered light patterns from the successively-irradiated micro-organism colonies, the plurality of images including at least first and second images of a first colony at respective, different wavelengths, and third and fourth images of a second, different colony at respective, different wavelengths.

15. The system according to claim 13, wherein:
the irradiation unit further comprises a sensor configured to detect a level value of the coherent electromagnetic radiation; and
the system further comprises a controller responsive to the level value and a selected set point to adjust an output level of the coherent electromagnetic radiation.

16. A system for the identification of micro-organisms, the system comprising:
an irradiation unit that sequentially provides coherent electromagnetic radiation of multiple wavelengths along a common optical path;
a holder adapted to retain a substrate having a surface adapted for growth of a micro-organism colony in operative arrangement to receive the coherent electromagnetic radiation along the common optical path;
a first imager arranged directly opposite a beamsplitter from the retained substrate and adapted to obtain first images of elastically backward-scattered light patterns from the micro-organism colony irradiated by the respective wavelengths of the coherent electromagnetic radiation, the elastically backward-scattered light patterns formed substantially from a first portion of the coherent electromagnetic radiation scattered back from the micro-organism colony;
a second imager arranged optically downstream of the retained substrate and adapted to obtain second images of forward-scattered light patterns from the micro-organism colony irradiated by the respective wavelengths of the directed coherent electromagnetic radiation, the forward-scattered light patterns substantially including a second portion of the coherent electromagnetic radiation scattered through the micro-organism colony; and
an optical density measurement unit that determines an optical density of the microorganism colony irradiated by the coherent electromagnetic radiation.

17. The system according to claim 16, further comprising:
a stage adapted to translate the retained substrate or irradiation unit with respect to each other so that the directed coherent electromagnetic radiation irradiates the micro-organism colony; and
a controller configured to:
operate the stage and the irradiation unit to irradiate a first colony of a plurality of micro-organism colonies on the retained substrate;
operate the first imager to obtain the first images of the backward-scattered light patterns and third images of the elastically backward-scattered light patterns from the first colony, the first images corresponding to a first wavelength and the third images corresponding to a second, different wavelength.

18. The system according to claim 17, wherein the controller is further configured to:
after operating the first imager to obtain the first images and the third images, operate the stage and the irradiation unit to irradiate a second colony of the plurality of micro-organism colonies on the retained substrate; and
operate the first imager to obtain fourth images and fifth images of elastically backward-scattered light patterns from the second colony, the fourth images corresponding to a third wavelength and the fifth images corresponding to a fourth wavelength different from the third wavelength.

19. The system according to claim 16, wherein:
the irradiation unit further comprises a sensor configured to detect a level value of the coherent electromagnetic radiation;
the level value corresponds to a selected one of the wavelengths; and
the system further comprises a controller responsive to the level value and a selected set point to adjust an output level of the coherent electromagnetic radiation of the selected one of the wavelengths.

20. The system according to claim 19, wherein:
the sensor is arranged substantially upstream of the retained substrate along the common optical path; and
the system further comprises a second sensor arranged optically downstream of the retained substrate and configured to detect a second level value of the coherent electromagnetic radiation.

* * * * *